United States Patent
Henderson et al.

(10) Patent No.: US 11,818,262 B2
(45) Date of Patent: *Nov. 14, 2023

(54) METHOD AND SYSTEM FOR ONE-TO-MANY SYMMETRIC CRYPTOGRAPHY AND A NETWORK EMPLOYING THE SAME

(71) Applicant: CORD3 INNOVATION INC., Ottawa (CA)

(72) Inventors: Glen Arthur Henderson, Ottawa (CA); Brent Eric Nordin, Ottawa (CA); Daniel Marcel Joseph Seguin, Navan (CA); Prateek Srivastava, Ottawa (CA); Ian Hugh Curry, Collex (CH)

(73) Assignee: CORD3 INNOVATION INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,920

(22) Filed: Sep. 19, 2022

(65) Prior Publication Data

US 2023/0224151 A1 Jul. 13, 2023

Related U.S. Application Data

(63) Continuation of application No. 17/157,864, filed on Jan. 25, 2021, now Pat. No. 11,451,386, which is a
(Continued)

(51) Int. Cl.
*H04L 9/08* (2006.01)
*G06F 21/60* (2013.01)
(Continued)

(52) U.S. Cl.
CPC .......... *H04L 9/0869* (2013.01); *G06F 21/602* (2013.01); *G09C 1/00* (2013.01);
(Continued)

(58) Field of Classification Search
CPC ............... G06F 21/602; H04L 2209/04; H04L 63/0435; H04L 63/10; H04L 9/0618;
(Continued)

(56) References Cited

U.S. PATENT DOCUMENTS 5,016,276 A * 5/1991 Matumoto ............ H04L 9/0847
380/47
7,096,355 B1 * 8/2006 Marvit .................. H04L 63/062
713/168

(Continued)

FOREIGN PATENT DOCUMENTS

WO 2016042693 3/2016

*Primary Examiner* — Gary S Gracia
(74) *Attorney, Agent, or Firm* — IP-MEX Inc.; Victoria Donnelly

(57) ABSTRACT

One-to-many cryptographic systems and methods are disclosed, and a network employing the same, including numerous industry applications. The embodiments of the present invention can generate and regenerate the same symmetric key from a random token. The one-to-many cryptographic systems and methods include a central location and a cryptographic module being in communication with each other. The cryptographic module is configured to encrypt and/or decrypt data received a remote location and output encrypted and/or decrypted data. The cryptographic module includes a key generator configured to use two or more inputs to reproducibly generate the symmetric key and a cryptographic engine configured to use the symmetric key for encrypting and decrypting data. Corresponding methods, and network employing the same, are also provided.

20 Claims, 23 Drawing Sheets

Related U.S. Application Data continuation of application No. 16/728,332, filed on Dec. 27, 2019, now Pat. No. 10,903,994, which is a continuation of application No. 15/905,232, filed on Feb. 26, 2018, now Pat. No. 10,742,408.

(60) Provisional application No. 62/524,576, filed on Jun. 25, 2017, provisional application No. 62/464,160, filed on Feb. 27, 2017.

(51) Int. Cl.
| | |
|---|---|
| *G09C 1/00* | (2006.01) |
| *H04L 9/14* | (2006.01) |
| *H04L 9/32* | (2006.01) |
| *H04L 9/40* | (2022.01) |
| *H04L 9/06* | (2006.01) |

(52) U.S. Cl.
CPC ............ *H04L 9/088* (2013.01); *H04L 9/0861* (2013.01); *H04L 9/0891* (2013.01); *H04L 9/14* (2013.01); *H04L 9/3213* (2013.01); *H04L 63/0435* (2013.01); *H04L 63/10* (2013.01); *H04L 9/0618* (2013.01); *H04L 2209/04* (2013.01)

(58) Field of Classification Search
CPC ..... H04L 9/0861; H04L 9/0869; H04L 9/088; H04L 9/0891; H04L 9/14; H04L 9/3213; G09C 1/00

See application file for complete search history.

(56) References Cited

U.S. PATENT DOCUMENTS

| | | | | |
|---|---|---|---|---|
| 7,120,696 | B1* | 10/2006 | Au | H04L 9/0891 |
| | | | | 713/400 |
| 8,670,564 | B1 | 3/2014 | Clayton | H04L 9/3013 |
| | | | | 380/46 |
| 9,037,865 | B1 | 5/2015 | Gopalakrishna | G06Q 20/363 |
| | | | | 713/184 |
| 9,608,809 | B1 | 3/2017 | Ghetti | H04L 9/0822 |
| 9,813,414 | B2 | 11/2017 | Camenisch | |
| 10,511,581 | B2* | 12/2019 | Jutla | H04L 9/0869 |
| 2001/0002486 | A1* | 5/2001 | Kocher | G06Q 20/367 |
| | | | | 713/171 |
| 2002/0129238 | A1* | 9/2002 | Toh | H04L 63/061 |
| | | | | 713/153 |
| 2006/0041762 | A1* | 2/2006 | Ma | H04L 9/3226 |
| | | | | 713/189 |
| 2008/0063191 | A1* | 3/2008 | Hatano | H04L 9/0833 |
| | | | | 380/45 |
| 2008/0095368 | A1* | 4/2008 | Iida | H04L 63/0442 |
| | | | | 380/259 |
| 2009/0262942 | A1* | 10/2009 | Maeda | H04L 9/083 |
| | | | | 380/278 |
| 2010/0002877 | A1* | 1/2010 | Zhang | H04L 9/0662 |
| | | | | 380/46 |
| 2010/0011431 | A1* | 1/2010 | Cynkin | G06F 21/6218 |
| | | | | 726/9 |
| 2010/0031014 | A1* | 2/2010 | Senda | H04N 1/32144 |
| | | | | 713/150 |
| 2010/0153735 | A1* | 6/2010 | Guenthner | G06F 21/34 |
| | | | | 713/183 |
| 2010/0313024 | A1* | 12/2010 | Weniger | H04L 63/0823 |
| | | | | 380/278 |
| 2011/0012711 | A1* | 1/2011 | Abe | G07F 7/1008 |
| | | | | 340/5.82 |
| 2012/0063592 | A1* | 3/2012 | Spalka | H04L 9/0631 |
| | | | | 380/28 |
| 2012/0110334 | A1* | 5/2012 | Rossi | H04L 63/0823 |
| | | | | 713/176 |
| 2012/0257747 | A1* | 10/2012 | Liardet | H04L 9/004 |
| | | | | 380/46 |
| 2012/0321077 | A1* | 12/2012 | Shiota | H04L 9/3247 |
| | | | | 380/44 |
| 2013/0062420 | A1* | 3/2013 | Hamman | G06Q 20/385 |
| | | | | 235/494 |
| 2013/0124866 | A1* | 5/2013 | Farrugia | H04L 9/0825 |
| | | | | 713/171 |
| 2013/0182840 | A1* | 7/2013 | Buckley | H04L 63/306 |
| | | | | 380/44 |
| 2013/0275744 | A1* | 10/2013 | Resch | H04L 67/10 |
| | | | | 713/150 |
| 2013/0326221 | A1* | 12/2013 | Murphy | H04L 51/18 |
| | | | | 713/168 |
| 2014/0082376 | A1* | 3/2014 | Roden | G06F 21/6272 |
| | | | | 713/193 |
| 2014/0101444 | A1* | 4/2014 | Lee | H04L 63/06 |
| | | | | 713/168 |
| 2014/0359272 | A1* | 12/2014 | Hiltunen | H04W 12/50 |
| | | | | 713/150 |
| 2015/0188893 | A1* | 7/2015 | Sood | H04L 63/0281 |
| | | | | 713/153 |
| 2015/0220717 | A1* | 8/2015 | Shin | G06V 20/80 |
| | | | | 726/28 |
| 2015/0312227 | A1* | 10/2015 | Follis | H04L 9/3247 |
| | | | | 713/176 |
| 2015/0365424 | A1* | 12/2015 | Pelletier | H04L 63/0869 |
| | | | | 713/170 |
| 2016/0028631 | A1* | 1/2016 | Yishay | H04L 45/7453 |
| | | | | 370/392 |
| 2016/0065366 | A1* | 3/2016 | Camenisch | H04L 9/0863 |
| | | | | 380/44 |
| 2016/0072772 | A1* | 3/2016 | Geigel | H04L 9/083 |
| | | | | 713/164 |
| 2016/0098580 | A1* | 4/2016 | Kaluzhny | H04L 9/0869 |
| | | | | 713/189 |
| 2016/0182467 | A1* | 6/2016 | Hang | H04L 63/0464 |
| | | | | 713/153 |
| 2016/0306585 | A1* | 10/2016 | George | G06F 3/0655 |
| 2017/0139851 | A1* | 5/2017 | Pean | G06F 13/20 |
| 2017/0155634 | A1* | 6/2017 | Camenisch | H04L 9/085 |
| 2017/0272472 | A1* | 9/2017 | Adhar | G06F 21/602 |
| 2017/0278433 | A1* | 9/2017 | Furukawa | G09C 1/00 |
| 2018/0211264 | A1* | 7/2018 | Micali | H04L 9/3247 |
| 2018/0248691 | A1* | 8/2018 | Henderson | H04L 9/0861 |
| 2018/0248692 | A1* | 8/2018 | Henderson | H04L 9/0869 |
| 2019/0028273 | A1* | 1/2019 | Harras | G06F 21/606 |

\* cited by examiner

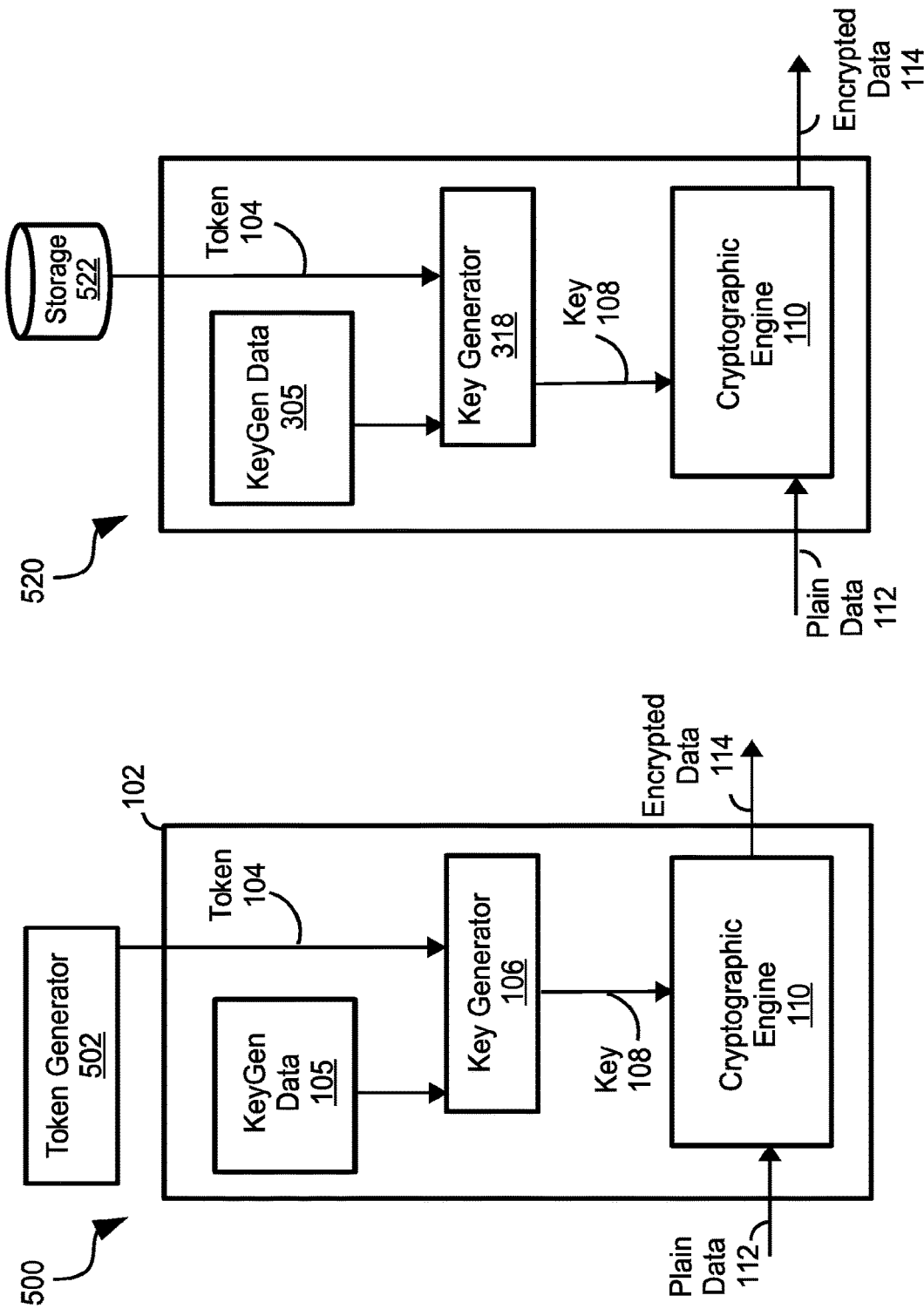

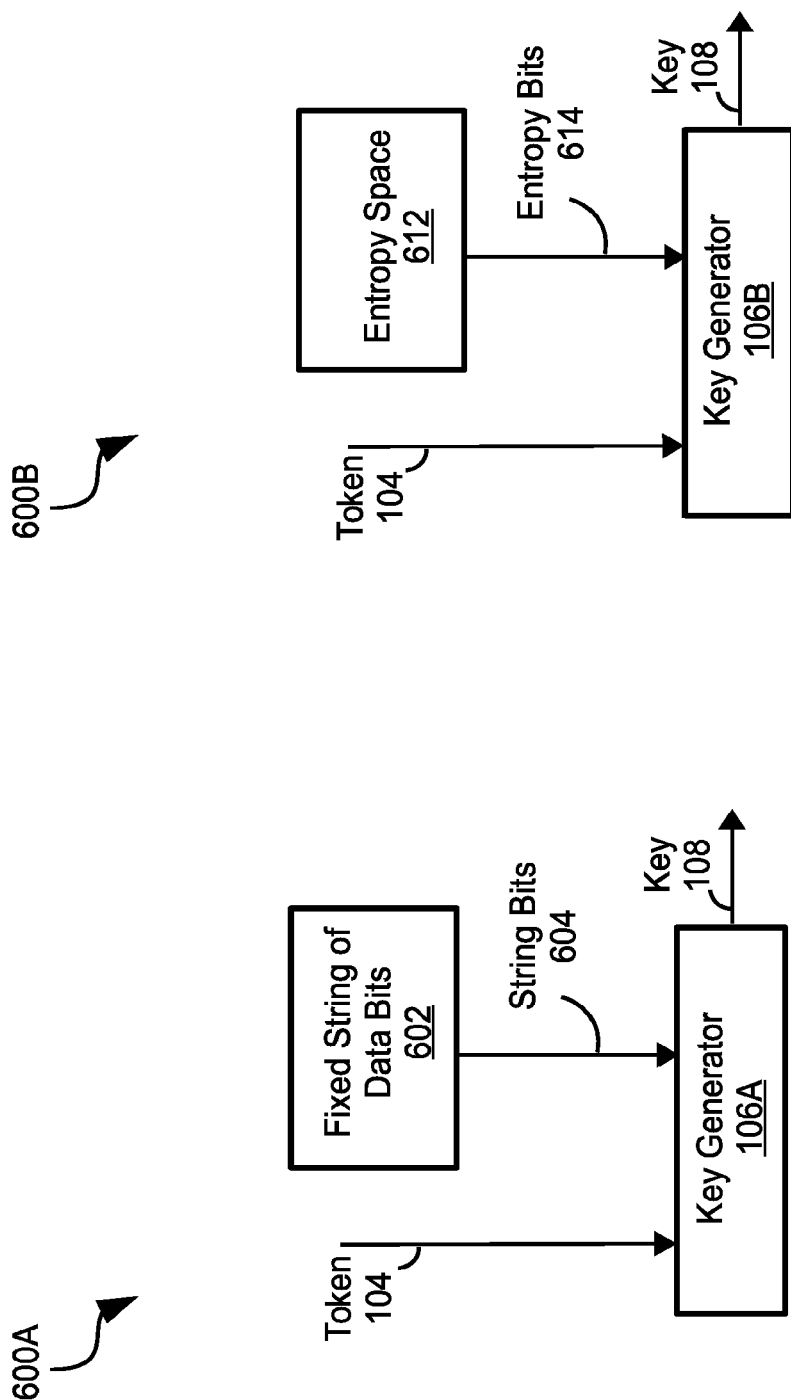

| Original Data | "Bit Mask" | XOR Result |
|---|---|---|
| 1 | 1 | 0 |
| 0 | 0 | 0 |
| 0 | 1 | 1 |
| 1 | 0 | 1 |

*FIG. 12*

METHOD AND SYSTEM FOR ONE-TO-MANY SYMMETRIC CRYPTOGRAPHY AND A NETWORK EMPLOYING THE SAME

REFERENCE TO RELATED APPLICATIONS

The present application is a continuation application of U.S. patent application Ser. No. 17/157,864 filed Ser. No. 17/157,864, which is now a U.S. Pat. No. 11,451,386 issued Sep. 20, 2022;

which is in-turn a continuation application of U.S. patent application Ser. No. 16/728,332 filed Dec. 27, 2019, which is now a U.S. Pat. No. 10,903,994 issued Jan. 26, 2021;

which is in-turn a continuation application of U.S. patent application Ser. No. 15/905,232 filed Feb. 26, 2018, which is now a U.S. Pat. No. 10,742,408 issued 10,742,408, which claims the benefit from U.S. Provisional Application Ser. No. 62/464,160 filed on Feb. 27, 2017, which also claims the benefit from U.S. Provisional Application Ser. No. 62/524,576 filed on Jun. 25, 2017;

the entire contents of which are incorporated herein by reference.

FIELD OF THE INVENTION

The present application relates to the general field of cryptography, and in particular to the generation and management of keys for cryptography.

BACKGROUND OF THE INVENTION

In a cryptographic system using symmetric cryptography (also known as "secret-key" cryptography), the involved parties share a common secret (password, pass phrase, or key). Data is encrypted and decrypted using the same key. Any party possessing a specific key can create encrypted messages using that key as well as decrypt any messages encrypted with the key. In systems involving a number of users who each need to set up independent, secure communication channels, symmetric cryptosystems can have practical limitations due to the requirement to securely distribute and manage large numbers of keys. Security of encrypted information is optimized when a different, random key is used for each piece of information. Consequently, a very large number of keys is required to deliver optimal security using symmetric cryptography.

Widely used cryptographic algorithms, such as the Advanced Encryption Standard (AES) and the Data Encryption Standard (DES) in its Triple-DES incarnation, are openly published and publicly available. These algorithms deliver strong security when an attacker cannot determine the key or keys used for encryption even though the attacker is fully aware and knowledgeable regarding the cryptographic algorithm used for encryption and may have the encrypted data available to repeatedly attempt to determine the encryption key(s).

The encryption keys used in cryptographic operations for symmetric cryptography are typically genuinely random. The use of a genuinely random key prevents an attacker from determining that key other than through what is known as a "brute-force attack". In a brute force attack, the attacker has to find the key through trial-and-error by sequentially trying permutations of possible keys in the space of all potential keys. If the number of possible permutations for a key is sufficiently large, it is infeasible for attackers to mount effective brute-force attacks to find keys in any reasonable time frame (on average), even using highly advanced computing systems.

A primary challenge to the use of cryptography is the management of the encryption keys. In this context, "encryption key management" refers to how strong encryption keys (i.e., random keys of sufficient length) are securely generated, stored, shared and, if and when necessary, recovered.

Key management issues can be very challenging to solve, as solving one of the key management issues often generates one or more additional key management issues or makes another key management issue more difficult to execute optimally.

For example, traditionally, symmetric encryption keys have been generated using hardware-based random number generators or software-based pseudo random number generators (PRNGs). However, once a traditional random number generator is used to generate a genuinely random number that is to be used as an encryption key, that key must be stored for later retrieval for decryption because it is impossible to deterministically re-generate that same key in the future using that same random number generator. In this regard, then, generating genuinely random numbers for strong symmetric keys leads directly to the need to store those keys securely for future retrieval.

Additionally, it is optimal to use a unique, genuinely random symmetric key for each distinct piece of information, rather than using a single key for all pieces of information or re-using a key across multiple pieces of information. If a different key is used for each piece of information, all other pieces of data will remain secure even if one key associated with one piece of information is compromised by some means.

However, when a unique key is used to protect each piece of information, the number of unique keys expands rapidly. This issue requires the management of keys to be executed in a scalable manner that will not limit the number of keys that can be generated and used. This ability to scale the key management can make it increasingly substantially difficult to securely store these keys.

Secure key storage is further made difficult for certain types of computer processes. For instance, services that operate on servers or in dedicated hardware appliances have a challenging requirement to store and access keys in a secure manner. Unlike servers and hardware appliances, endpoint devices, such as workstations and mobile devices, can be directly accessed by users and, therefore, keys can be stored securely using user-entered passwords or other techniques that can generate keys to encrypt and decrypt stored keys. In other words, when a key need to be accessed, an end user can be prompted to enter the corresponding password, passphrase, or other information that generates a key to decrypt the key or keys stored securely.

However, it is not possible for humans to easily or effectively enter passwords on computer servers or hardware appliances for server applications, other than potentially when the server applications first "boot up" and initialize. Once a server application is operating, it is not realistically possible to stop the application to wait for a person to enter information to "unlock" a key. Given the speed and capacities of modern servers and appliances serving many users at one time, stopping a server application to have a human "unlock" a key is infeasible from all perspectives. Therefore, the technique explained above to protect keys stored on end-user devices cannot be used to protect keys on servers. This is a significant issue because servers often hold vast amounts of information that would be optimally secured using a large number of keys.

Further, the sharing of a large number of keys is also extremely difficult. If each piece of information is encrypted with a unique key, those keys need to be shared by any users and software/hardware processes needing to access the information. Securely sharing one key or a small number of keys among a group of people or software/hardware processes is challenging. Securely sharing a large number of keys among a similar group is completely untenable. There is a significant problem in scalability related to key sharing.

Clearly, there is a need for a cryptographic system that mitigates these issues by enabling broad-scale use of symmetric cryptography with genuinely random keys, but eliminating the need for users to share keys to enable encryption/decryption, and eliminate the need for keys to be stored.

SUMMARY OF THE INVENTION

There is an object of the invention to provide an improved symmetric cryptographic system and method.

There is also another object of the invention to provide an improved method and system for generating and managing a cryptographic key for a symmetric cryptographic system.

Also there is an object of the invention to provide various applications of the improved cryptographic system and method, as substantially described herein below.

According to one aspect of the invention, there is provided a symmetric cryptographic system, comprising: a memory having computer executable instructions stored thereon, causing a processor to form: two or more inputs, at least one of said two or more inputs being secret; a key generator configured to use said two or more inputs to reproducibly generate a secret key; and a cryptographic engine configured to use the secret key for encrypting data, thereby creating encrypted data.

In the system described above, the cryptographic engine is further configured to generate and use the secret key for decrypting the encrypted data.

In the system described above, said two or more inputs comprise a first input and a second input; and the second input is based at least in part on the first input. In the system described above, the second input may be a fixed string of data bits.

Alternatively, the second input may be a plurality of bits from an entropy bit string. Accordingly, the key generator further comprises an entropy bit string generator generating the plurality of bits from the entropy bit string based in part on the first input.

In the system described above: the key generator comprises a deterministic algorithm module using a symmetric algorithm for generating random numbers; the symmetric algorithm reproducibly generates the same random number based on same said two or more inputs; the random number is utilized to create said secret key.

The system further comprises a third input, and the key generator is configured to further use the third input to reproducibly generate the secret key. The third input may be at least one bit mask.

Alternatively, the third input may be one or more bit masks, and at least one of the following is secret: the first input, the first input being a token; the second input, the second input comprising at least one of the following which is secret: an entropy bit string; a random number generator for selecting a plurality of bits from the entropy string based in part on the token; the plurality of bits; and the third input.

The secret key is generated prior to the encrypting, and destroyed after completion of the encrypting.

According to another aspect of the invention, there is provided an apparatus for generating and managing a cryptographic key for a symmetric cryptographic system, the apparatus comprising: a memory device having computer readable instructions stored thereon for execution by a processor, causing the processor to form: the cryptographic key having two states: a potential state where the cryptographic key is comprised of two or more input components from which the cryptographic key is to be generated, at least one of said two or more input components being secret, the cryptographic key in the potential state not being suitable for encrypting or decrypting data; an active state where the cryptographic key has been generated using said two or more input components, the cryptographic key in the active state being suitable for encrypting or decrypting data; a cryptographic key generator for transforming the cryptographic key from the potential state into the active state using said two or more input components immediately prior to the encrypting or decrypting the data, and transforming the cryptographic key from the active state back into the potential state immediately upon the encryption or decryption of the data has been completed.

According to yet another aspect of the invention, there is provided a symmetric cryptographic system, comprising: at least two cryptographic modules, each of the at least two cryptographic modules having a memory having computer executable instructions stored thereon, causing a processor to form: two or more inputs, at least one of said two or more inputs being secret; a key generator configured to use said two or more inputs to reproducibly generate a secret key; an cryptographic engine configured to use the secret key for encrypting data, thereby creating encrypted data, the cryptographic engine configured to use the secret key for decrypting the encrypted data, said at least one of said two or more input is secret.

The least one of the at least two cryptographic modules encrypts the data and another one of the at least two cryptographic modules decrypts the encrypted data.

In the system described above, the two or more inputs comprise a first input and a second input; the first input is a token, and the second input is a fixed string of bits obtained from an entropy bit string.

The key generator comprises a deterministic algorithm module using a symmetric algorithm for generating random numbers; the symmetric algorithm reproducibly generates the same random number based on same said two or more inputs; and the random number is utilized to create said secret key.

Additionally a third input may be further used, the third input being one or more bit masks for example.

The system is configured to generate the secret key respectively prior to the encrypting or decryption, and respectively destroy the secret key after completion of the encrypting or decrypting.

According to one more aspect of the invention, there is provided a method for symmetric cryptography, comprising: employing at least one hardware processor for: at an encryption location: obtaining two or more inputs, at least one of said two or more inputs being secret; using said two or more inputs to reproducibly generate a secret key; encrypting data using the secret key, thereby creating encrypted data; at a decryption location: obtaining said two or more inputs; using said two or more inputs to reproducibly generate the secret key; using the secret key generated at the decryption location to decrypt the encrypted data; communicating said at least one of said two or more inputs which is secret, and computer readable instructions for reproducibly generating the secret key to both the encryption and decryption locations prior to the encrypting and the decrypting.

In the method described above, the obtaining the two or more inputs further comprises obtaining a first input and a second input, wherein the first input is a token, and the second input is a fixed string of bits obtained from an entropy bit string.

In the method described above: the step to reproducibly generate the secret key comprises applying a deterministic symmetric algorithm for generating random numbers; wherein the same random number is generated based on same said two or more inputs and the random number is utilized to create said secret key.

In the method described above, the obtaining the two or more inputs further comprises obtaining a third input, which is one or more bit masks.

The method further comprises generating the secret key respectively prior to the encrypting or decrypting, and respectively destroying the secret key after completing the encrypting or decrypting.

According to yet one more aspect of the invention, there is provided a one-to-many symmetric cryptographic system having a central location being in communication with at least one remote location, the system comprising: the central location having a memory having executable instructions stored thereon, causing a processor to: receive a document from at least one of at least one remote location; and provide the document to a cryptographic module for encryption, the cryptographic module having: two or more inputs, at least one of said two or more inputs being secret and at least one of said two or more inputs being specific to the document; a key generator configured to use said two or more inputs to reproducibly generate a secret key specific to each document; and a cryptographic engine configured to use the secret key for encrypting the document, thereby creating an encrypted document.

In the one-to-many system described above, the processor is further configured to provide the document to the cryptographic module for decryption, and the cryptographic engine is further configured to generate and use the secret key for decrypting the encrypted data.

The document may be an email message, or a file. The file may be stored locally, or at a remote location.

The one-to-many system described above further comprises a storage configured to store the encrypted document.

In the one-to-many system described above, at least one of the two or more inputs is publicly available.

In the one-to-many system described above, one of the two or more inputs is a fixed string of data bits. Additionally, a third input may be also provided, and the key generator is configured to further use the third input to reproducibly generate the secret key. The third input is at least one bit mask.

In the one-to-many system described above, the key generator may comprise a deterministic algorithm module using a symmetric algorithm for generating random numbers; the symmetric algorithm reproducibly generates the same random number based on same said two or more inputs; and the random number is utilized to create said secret key.

Alternatively, in the one-to-many system described above, said two or more inputs comprise a first input and a second input; the first input is a token, and the second input is a fixed string of bits obtained from an entropy bit string. The second input may be based at least in part on the first input, and the key generator may further comprise an entropy bit string generator generating the plurality of bits from the entropy bit string based in part on the first input.

In the one-to-many system described above, the secret key is generated prior to the encrypting, and destroyed upon completion of the encrypting.

According to yet one more aspect of the invention, there is provided a method for one-to-many symmetric cryptography within a symmetric cryptographic system having a central location being in communication with at least one remote location, comprising: at the central location: receiving a document from at least one of at least one remote locations; and encrypting the document comprising: obtaining two or more inputs, at least one of said two or more inputs being secret and at least one of said two or more inputs being specific to the document; using said two or more inputs to reproducibly generate a secret key specific to each document; and encrypting the document using the secret key, thereby creating an encrypted document.

The method further comprises decrypting the encrypted document using the secret key.

In the method described above, the document is an email message or a file.

In the method described above, at least one of the two or more inputs is publicly available. The step of encrypting the document may further comprise obtaining a third input, and using the third input to reproducibly generate the secret key. The third input may be a bit mask.

According to yet one further aspect of the invention, there is provided a many-to-many symmetric cryptographic system comprising: a plurality of cryptographic modules being in communication over a communication network; each of the plurality of cryptographic modules having a memory having executable instructions stored thereon, causing a processor to: receive a document from at least one of the remaining plurality of cryptographic modules for encryption creating an encrypted document; provide the encrypted document to at least one of the remaining plurality of cryptographic modules for decryption creating a decrypted document; each of the plurality of cryptographic modules having: two or more inputs, at least one of said two or more inputs being secret and at least one of said two or more inputs being specific to the document; a key generator configured to use said two or more inputs to reproducibly generate a secret key specific to each document; and a cryptographic engine configured to use the secret key for encrypting the document, thereby creating the encrypted document and configured to use the secret key for decrypting the encrypted document, thereby creating the decrypted document, wherein the secret key specific to the document is destroyed after the completion of the encrypting and after the completion of the decrypting.

The many-to-many system described above further comprises a storage in communication with the communication network and being configured to store each encrypted document.

In the many-to-many system described above, at least one of the two or more inputs is publicly available, and the at least one publicly available inputs is at stored on the storage.

In the many-to-many system described above, one of the two or more inputs is a fixed string of data bits.

In the many-to-many system described above, one of the two or more inputs may be a plurality of bits from an entropy bit string.

In the many-to-many system described above, the key generator is a deterministic algorithm module using a symmetric algorithm for generating random numbers; the symmetric algorithm reproducibly generates the same random number based on same said two or more inputs; and the random number is utilized to create said secret key.

In the many-to-many system described above, the two or more inputs comprise a first input and a second input; and the second input is based at least in part on the first input. The key generator further has an entropy bit string generator generating a plurality of bits from an entropy bit string based in part on the first input.

The many-to-many system may further have a third input; and the key generator is configured to further use the third input to reproducibly generate the secret key. The third input may be at least one bit mask.

According to yet one more aspect of the invention, there is provided a method for many-to-many symmetric cryptography within a symmetric cryptographic system having a plurality of cryptographic modules being in communication over a communication network, the method comprising: employing a plurality of hardware processor for performing the following: at each cryptographic module, receiving a document from at least one of the remaining of the plurality of cryptographic modules for encryption for creating an encrypted document; providing the encrypted document to at least one of the remaining of the plurality of cryptographic modules for decryption creating a decrypted document, each the cryptographic module: obtaining two or more inputs, at least one of said two or more inputs being secret and at least one of said two or more inputs being specific to the document; reproducibly generating a secret key specific to the document using said two or more inputs; and encrypting the document using the secret key, thereby creating the encrypted document, and decrypting the encrypted document using the secret key, thereby creating the decrypted document.

The method further comprises storing the encrypted document at a storage in communication with the communication network.

In the method described above, at least one of the two or more inputs is publicly available.

In one embodiment of the invention, one of the two or more inputs is a fixed string of data bits. In another embodiment, one of the two or more inputs is a plurality of bits from an entropy bit string.

The step of reproducibly generating the secret key may comprise a symmetric algorithm for generating random numbers; the symmetric algorithm reproducibly generates the same random number based on same said two or more inputs; and the random number is utilized to create the secret key.

In the method described above, the step of obtaining the two or more inputs comprises obtaining a first input and a second input; and the second input is based at least in part on the first input.

The step of reproducibly generating the secret key comprises generating a plurality of bits from an entropy bit string based in part on the first input.

The method further comprises obtaining a third input; and reproducibly generating the secret key using the third input. The third input is at least one bit mask.

Thus, an improved symmetric cryptographic system and method, and method and system for generating and managing a cryptographic key for a symmetric cryptographic system have been provided.

BRIEF DESCRIPTION OF THE DRAWINGS

In drawings which illustrate embodiments of the invention wherein similar characters of reference denote corresponding parts in each view.

FIG. 5A is a block diagram of an embodiment of a cryptographic module key generator shown in FIG. 1A illustrating a token being generated from a token generator;

FIG. 5B is a block diagram of an embodiment of a cryptographic module key generator shown in FIG. 1A illustrating a token being received from a storage;

FIG. 6A is a block diagram of an additional embodiment of a key generator shown in FIG. 1A;

FIG. 6B is a block diagram of an additional embodiment of a key generator shown in FIG. 1A;

FIG. 12 is a table illustrating results from a bit mask processing using an XOR procedure;

DETAILED DESCRIPTION OF EMBODIMENTS OF THE INVENTION

Figure 1:
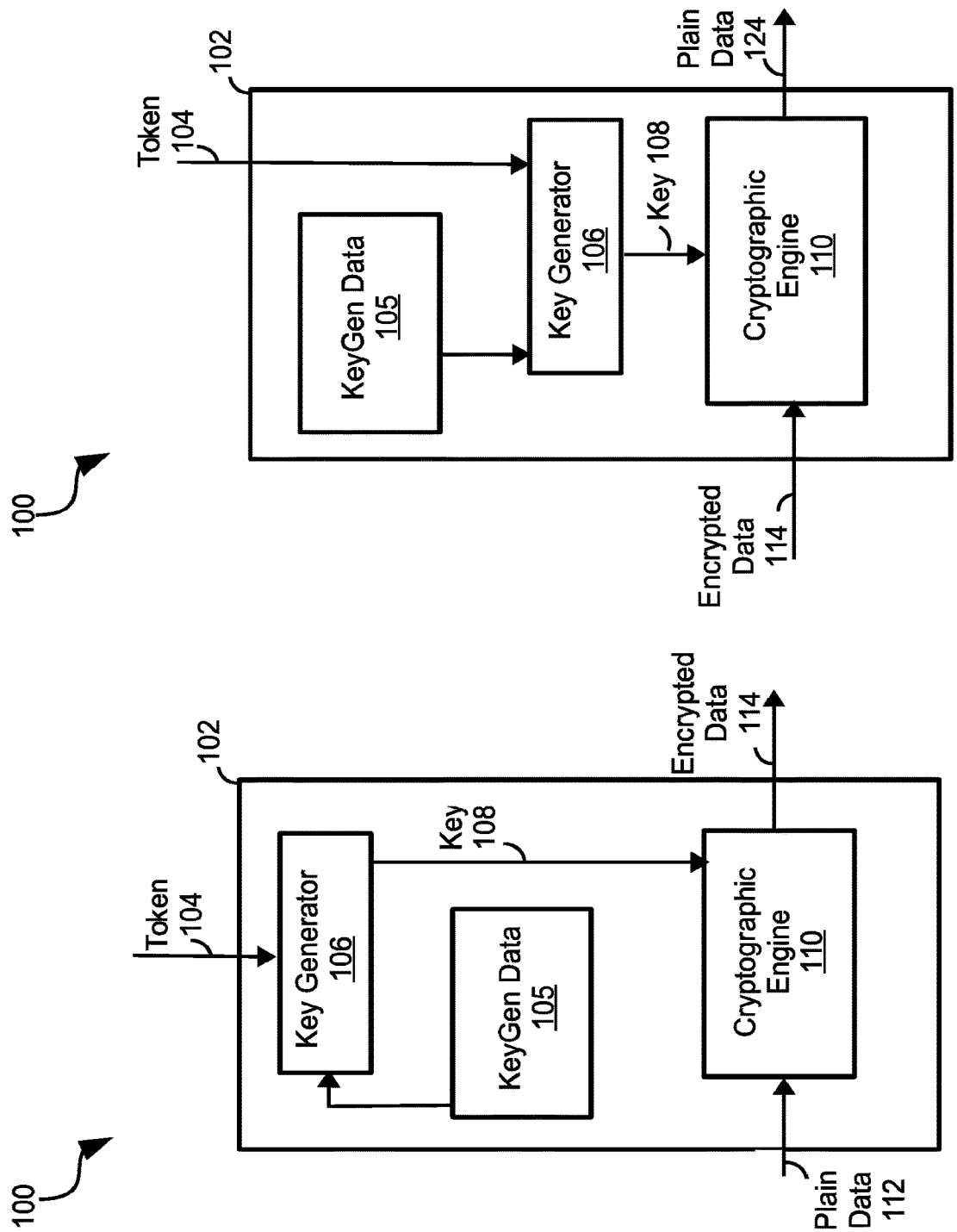
FIG. 1A is a block diagram of a cryptographic system illustrating encryption in accordance with an embodiment of the present invention.
FIG. 1B is a block diagram of the cryptographic system shown in FIG. 1A illustrating decryption in accordance with an embodiment of the present invention.

Embodiments of the present invention generally provide systems and methods that perform encryption and decryption of data. In particular, embodiments of the present invention use symmetric cryptography for encryption/decryption.

Embodiments of the present invention minimize the challenges of key management by avoiding key storage and transmission altogether. This accomplished by enabling software and hardware processes to generate and re-generate keys when needed, rather than storing and/or transmitting keys through complex schemes. These embodiments provide keys that are scalably and securely generated and re-generated when needed by the processes that use the keys.

Embodiments of the present invention can generate and regenerate the same symmetric key from a token, but knowledge of the token does not provide any advantage to an attacker to derive the symmetric key. This provides advantages over conventional cryptography systems because conventional approaches to using symmetric keys for cryptography require securely storing large numbers of symmetric keys in a central location, or a shared secret for users to enter to generate and regenerate the same key, or the use of key sharing techniques, such as public-key cryptography. Improving key management for symmetric cryptography is important because it is projected that currently used, widely available algorithms for public-key cryptography, such as an Rivest-Shamir-Adleman (RSA) algorithm or a wide variety of Elliptic-Curve Cryptography algorithms, will be rendered breakable through the use of quantum computers, whereas symmetric cryptography algorithms, such as AES with 256-bit keys, will not be broken by quantum computing when keys are genuinely random.

Embodiments of the present invention eliminate the need for cryptographic key management. Generating a random number for a symmetric key and being able to regenerate the same random number in the future based on a "token" mitigates the problems of key management. The ability to have a "token" be able to be known, but to have knowledge of the "token" provide no advantage to an attacker determining the key is essential to the elimination of key management issues.

Referring to FIGS. 1A and 1B, there is shown a block diagram of a system 100 in accordance with an embodiment of the present invention.

The system 100 includes a cryptographic module 102 having a key generator 106 for reproducibly generating the same symmetric key 108 using a first input, referred to as token 104 and a second input, referred to as KeyGen data 105. The token 104 may be a randomly generated number and the KeyGen data 105 may be a sequence of bits (0's and 1's), which may or may not be random, which are used by the key generator 106 to create symmetric key 108. Token 104 may be publicly available while KeyGen data 105 may be secured and not available publicly. KeyGen data 105 is illustrative as residing within cryptographic module 102. This is not meant to be limiting as those skilled in the art will recognize that KeyGen data 105 may be securely stored outside of cryptographic module 102. Further, it is indicated that token 104 is publicly available while KeyGen data 105 is not publicly available. This is illustrative and not meant to be limiting. Those skilled in the art will recognize that it is within the scope of the invention that only one of token 104 and KeyGen data 105 may be not publicly available while the remaining input may be publicly available.

Token 104 may be a set of bits that includes random bits and, if desired, information bits. Token 104 may also be initially a random number generated using traditional hardware-based or software-based random number generation. It can be of varying sizes depending on system configuration. The token 104 is a number that is used as a first input to key generator 106. Token 104 is initially created by a token generator 502, see FIG. 5A, during the initial process of generating a key 108 for encryption. Once generated, tokens may be stored with the encrypted data or separately in a storage device 522. When there is a need to decrypt the encrypted data at a later time, the token 104 may be received from the storage device 522 or along with encrypted data and used to regenerate the key 108, see FIG. 5B.

KeyGen data 105, as referred to as the second input, may be a fixed, static sequence of bits, a sequence of bits generated independently from the first input or a sequence of bits generated based in part on the first input. Various embodiments of KeyGen data 105 are described below.

Key generator 106 is the module of the present invention that reproducibly generates key 108. Key generator 106 is configured to use two or more unique inputs, i.e. a number and sequences of bits, in this embodiment a token 104 and a KeyGen data 105, to create the key 108. The processes by which key 108 is created by key generator 106 is largely dependent upon the type and condition of the inputs. As will be described below, key generator 106 may include one or more algorithms, such as symmetric cryptography algorithms, bit selection algorithms and entropy bit string generator algorithms.

Reproducibly generating the same symmetric key 108 means key 108 can be reproduced at different points in time and is not maintained or stored after its use to encrypt or decrypt data. Key 108 can be of variable length. Key generator 106 can generate/regenerate an appropriate length key 108 for a cryptographic algorithm that will use the key 108. This is advantageous since various symmetric algorithms use different lengths of cryptographic keys.

Cryptographic module 102 also includes a cryptographic engine 110 for encrypting an input plain data 112 using key 108 provided by key generator 106 into encrypted data 114, see FIG. 1A, and for decrypting encrypted data 114 into plain data 124 which is substantially identical to plain data 112, see FIG. 1B. The cryptographic engine 110 may be, for example, a Triple-Data Encryption Standard (Triple-DES) algorithm, an Advanced Encryption Standard (AES) algorithm or any other symmetric algorithm known in the art, whether that algorithm is known now or is developed at some point in the future.

This embodiment illustrates a single cryptographic module 102 configured to both encrypt and decrypt data while being located at a single location utilizing a single publicly available input and a single not publicly available input. Those skilled in the art will recognize this is illustrative and not meant to be limiting. As will be shown below, it is within the scope of the present invention to have multiple cryptographic modules located at various locations having more than one publicly and/or not publicly available inputs.

Further, system 102 may create multiple encryption keys by changing token 104. When token 104 is changed, key generator 106 may generate a completely different key 108. Thus, system 102 enables a highly scalable key management approach but does not require keys to be stored. This type of system is ideal for server-based computer processes where human intervention is not possible and there is a need for a large number of encryption keys to deliver optimal security.

Figure 2:
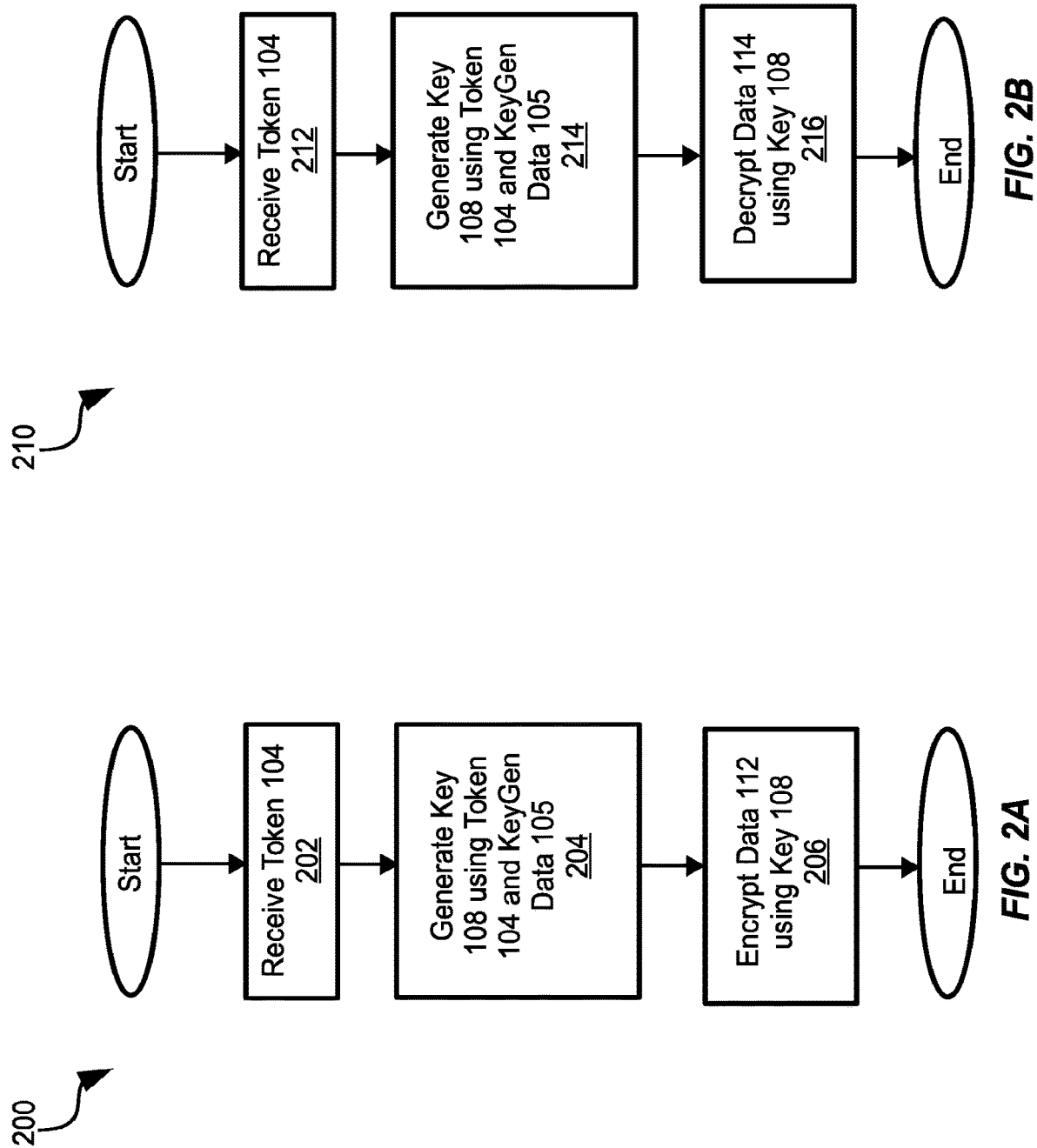
FIG. 2A is a flowchart of a method for encrypting data utilizing the cryptographic system shown in FIG. 1A in accordance with the embodiment of the present invention.
FIG. 2B is a flowchart of a method for decrypting data utilizing the cryptographic system shown in FIG. 1B in accordance with the embodiment of the present invention.

Referring now to FIG. 2A there is shown a flowchart 200 of a method for encrypting data in accordance with an embodiment of the present invention.

First, token 104 is received 202 by cryptographic module 102. Token 104 may be generated, as set out above, if this is the token's initial use as input to the key generator 106. If token 104 has previously been generated and stored in a storage device or along with data, cryptographic module 102 may receive token 104 from that storage device or along with data.

Next, key 108 is generated 204 using token 104 and KeyGen data 105 by key generator 106 as described in detail herein below.

Next, the input plain data 112 is encrypted 206 into encrypted data 114 by the cryptographic engine 110 using key 108.

Referring now to FIG. 2B there is shown a flowchart 210 of a method for decrypting data in accordance with an embodiment of the present invention.

First, token 104 is received 212 by cryptographic module 102. Next, key 108 is regenerated 214 using the first token 104 and KeyGen data 105 by key generator 106. Then, the encrypted data 114 is decrypted 216 by the cryptographic engine 110 using key 108.

Figure 3:
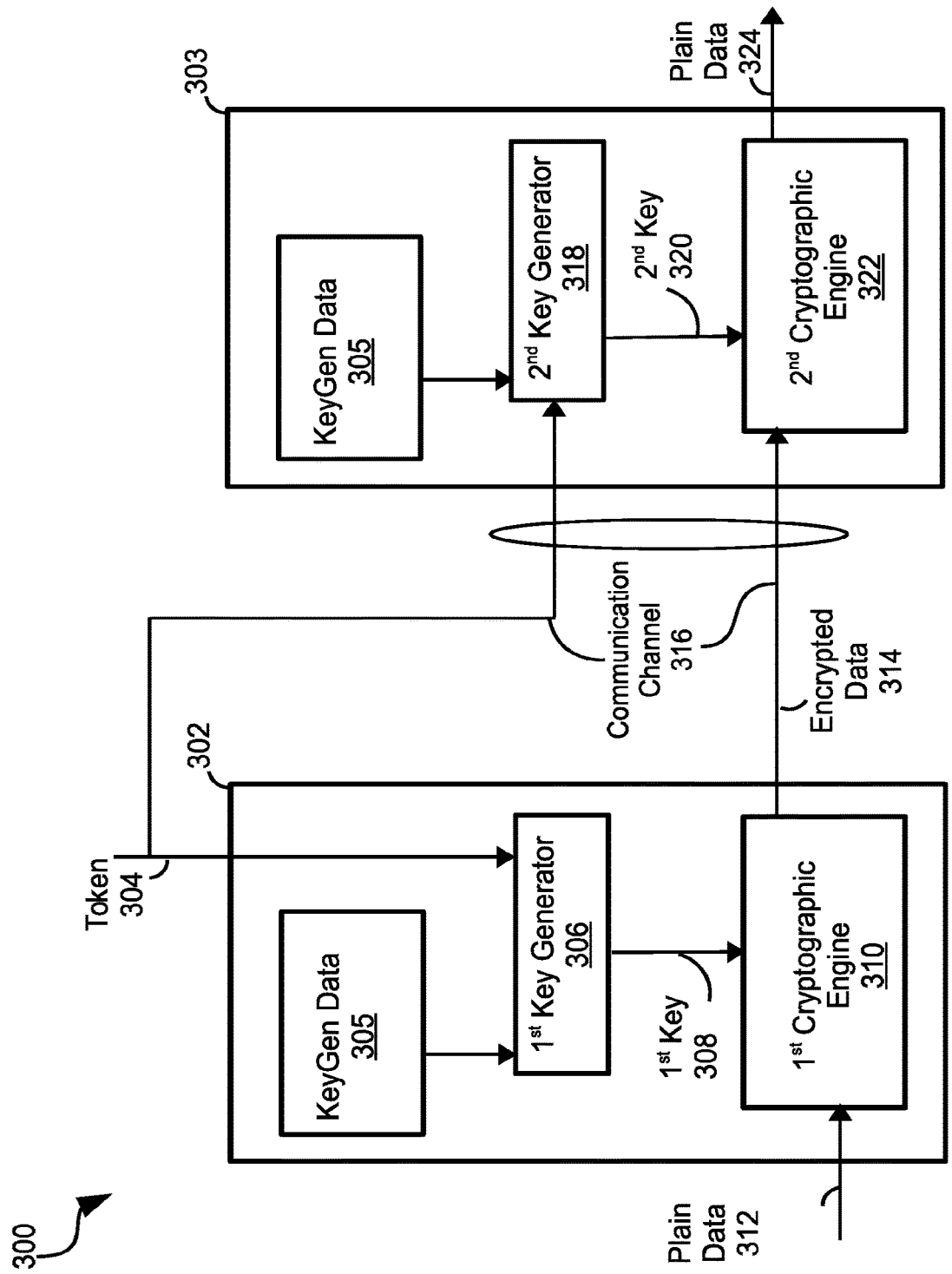
FIG. 3 is a block diagram of a cryptographic system illustrating encryption and decryption in accordance with an embodiment of the present invention.

Referring to FIG. 3, there is shown a block diagram of a system 300 in accordance with an additional embodiment of the present invention.

The system 300 includes a first cryptographic module 302 located at a first location and a second cryptographic module 303 located at a second location, with first cryptographic module 302 being in communication with second cryptographic module 303 by a communication channel 316 over which information is transmitted. The use of communication channel 316 is illustrative and not meant to be limiting. Those skilled in the art will recognize that two or more cryptographic modules may be capable of utilizing shared information, i.e. a token, encrypted/decrypted data files, etc, over a variety of network configurations. First cryptographic module 302 has the same cryptographic module components as the second cryptographic module 303.

First cryptographic module 302 includes a first key generator 306 and KeyGen data 305 for reproducibly generating a first key 308 using token 304. The first key 308 can be of variable length. The first key generator 306 can generate/regenerate an appropriate length first key 308 for a cryptographic algorithm that will use the first key 308. Reproducibly generating the same symmetric key 308 means key 308 can be reproduced at different points in time and does not have to be maintained or stored after its use to encrypt or decrypt data.

First cryptographic module 302 also includes a first cryptographic engine 310 for encrypting and decrypting data. In this embodiment, first cryptographic engine 310 encrypts input plain data 312 using the first key 308 provided by the first key generator 306 into encrypted data 314. The first cryptographic engine 310 may be, for example, a Triple-Data Encryption Standard (Triple-DES) engine algorithm, an Advanced Encryption Standard (AES) engine algorithm or any other symmetric encryption engine algorithm known in the art, whether that algorithm is known now or is developed at some point in the future. Once encrypted data 314 has been created, first key 308 may be deleted or otherwise not stored or saved.

Second cryptographic module 303 is substantially identical to the first cryptographic module 302 having a second key generator 318 and KeyGen data 305 for reproducibly generating a key and a second cryptographic engine 322 for encrypting and decrypting data. In this embodiment, the second cryptographic module 303 receives token 304 and encrypted data 314 across a communication channel or through accessing a shared media storage location 316, which could be an open communication channel, such as the Internet, or a file server, or a Cloud storage service. Second key generator 318 uses token 304 and KeyGen data 305 to produce a second key 320, which is identical to the first key 308. Cryptographic engine 322 then decrypts encrypted data 314 using the second key 320 thereby producing an output plain data 324, which is substantially identical to the original input plain data 312.

While token 304 may be stored together with encrypted data 314, there is no requirement that token 304 be stored with the encrypted data 314 or transmitted with the encrypted data 314. However, there needs to be an association maintained between encrypted data 314 and token 304.

This embodiment illustrates two cryptographic modules 302, 303 configured to both encrypt and decrypt data while being located at two separate locations.

Figure 3A:
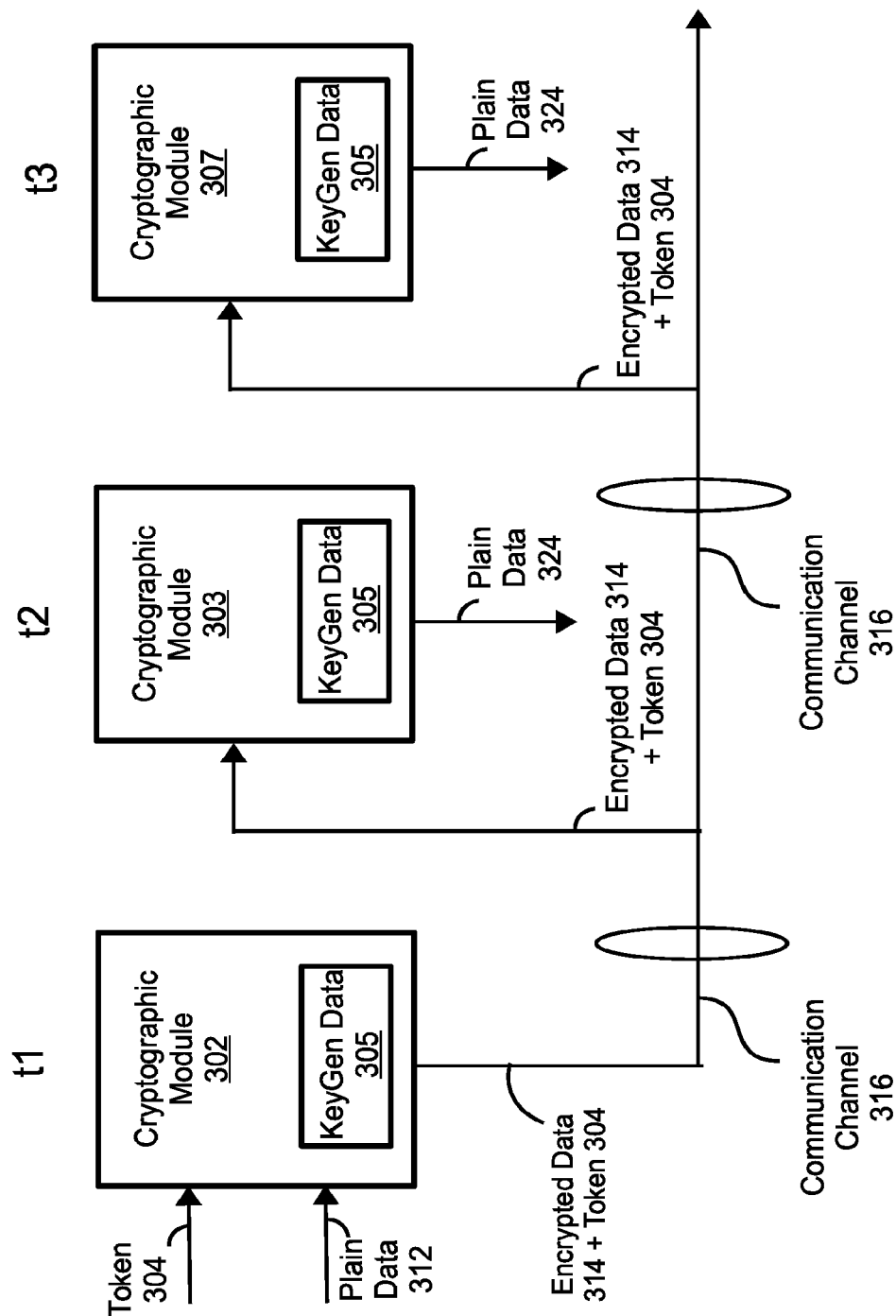
FIG. 3A is a block diagram of a cryptographic system illustrating encryption and decryption in accordance with an embodiment of the present invention.

Referring now to FIG. 3A, there is shown a block diagram of the system 300 having multiple cryptographic modules along a time line. At the first time interval, t1, is the first cryptographic module 302. At the second time interval, t2, is the second cryptographic module 303. At the third time interval, t3, is the third cryptographic module 305. All of the cryptographic modules have similar components for encryption and decryption, include a key generator, not shown, and KeyGen data 305 for use with the key generator, according to embodiments of the present invention. Each key generator utilizes at least two inputs, in this embodiment two inputs, KeyGen data and token 304, to create a key 108 which is used during the encryption and decryption procedures. In this embodiment, token 304 is publicly available which KeyGen data 305 is kept secret.

At the first time interval, t1, first cryptographic module 302 receives token 304. Since this is the initial use of token 304, it is created, or generated by a token generator, not shown. First cryptographic module 302 also receives plain data 312. Utilizing token 304 and KeyGen data 305, first cryptographic module 302 encrypts plain data 312 into encrypted data 314.

At the second time interval, t2 encrypted data 314 and token 304 are provided to the second cryptographic module 303 across communication channel 316. Encrypted data 314 and token 304 may be stored in a data storage device during the time between the first time interval, t1, and the second time interval, t2. Once encrypted data 314 and token 304 are received by the second encryption module 303, token 304 and KeyGen data 305 are used in the process to decrypt encrypted data 314 into plain data 324, which is substantially similar to plain data 312.

If it is desired to decrypt encrypted data 314 at a third time interval, t3, encrypted data 314 and token 304 are provided to the third cryptographic module 305 across communication channel 316. Encrypted data 314 and token 304 may be stored in a data storage device during the time between the first time interval, t1, and the third time interval, t3. Once encrypted data 314 and token 304 are received by the third encryption module 305, token 304 and KeyGen data 305 are used in the process to decrypt encrypted data 314 into plain data 324, which is substantially similar to plain data 312.

Figure 4A:
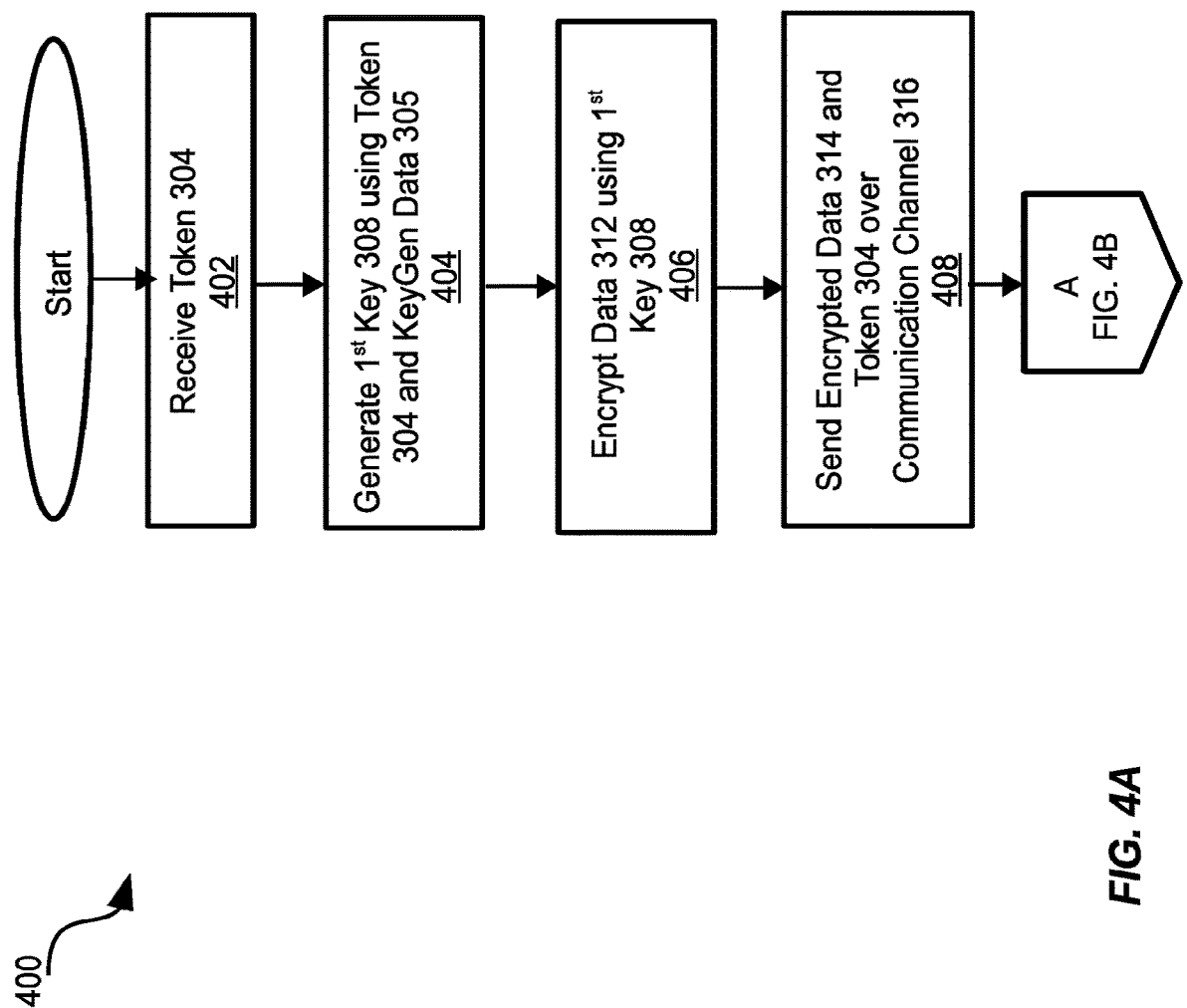
FIG. 4A is part of a flowchart of a method for encrypting and decrypting data utilizing the cryptographic system shown in FIG. 3 in accordance with the embodiment of the present invention.
Figure 4B:
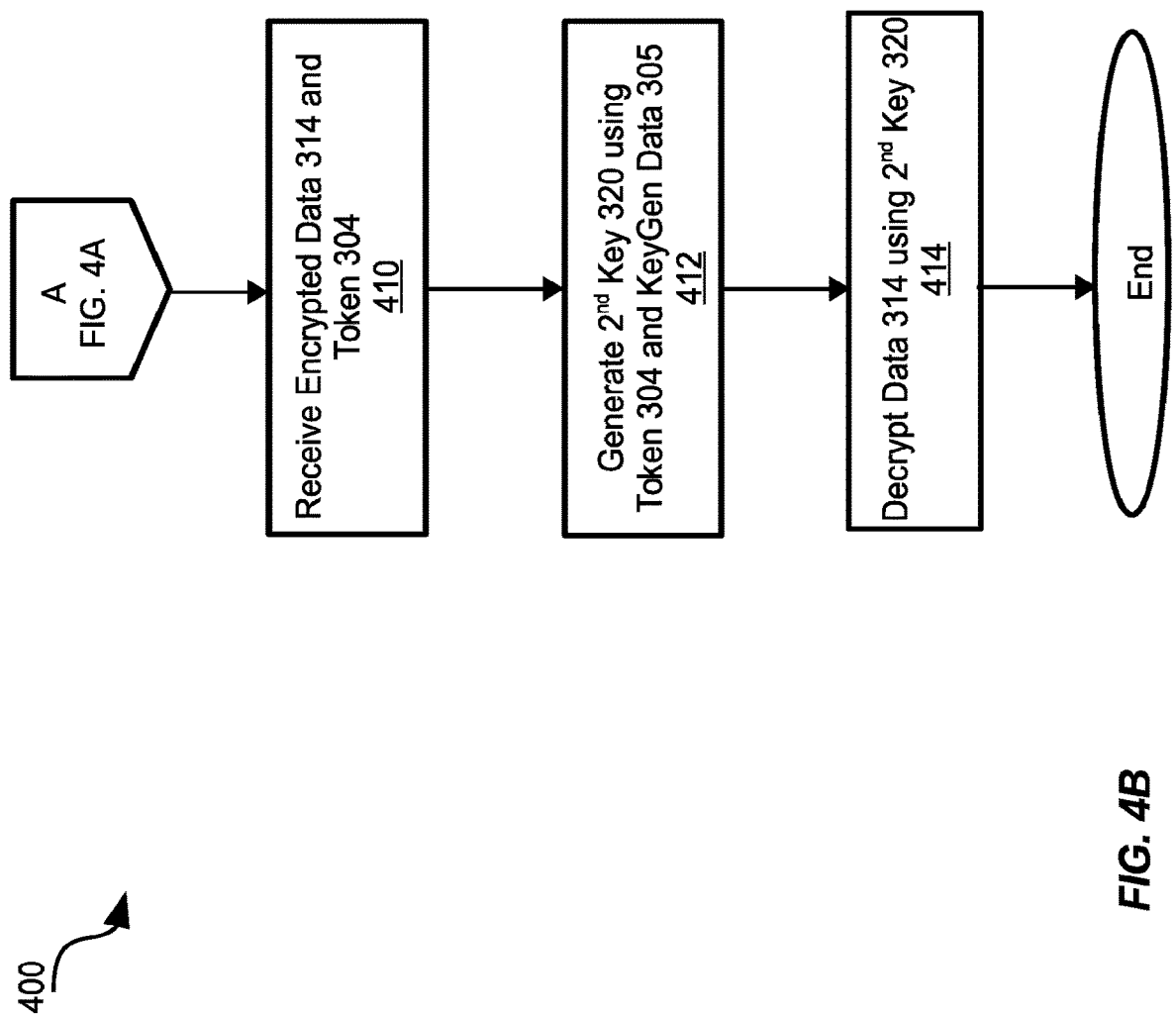
FIG. 4B is part of a flowchart of a method for encrypting and decrypting data utilizing the cryptographic system shown in FIG. 3 in accordance with the embodiment of the present invention.

Referring now to FIGS. 4A and 4B there is shown a flowchart 400 of a method in accordance with an embodiment of the present invention.

First, the first token 304 is received 402 by cryptographic module 302. Token 304 may be generated, as set out above, if this is the token's initial use as input to the key generator 306. If token 304 has previously been generated and stored in a storage device, cryptographic module 302 may receive token 304 from that storage device.

Next, the first key 308 is generated 404 using the first token 304 and KeyGen data 305 by the first key generator 306 as described in detail herein below.

Next, the input data 312 is encrypted 406 by the first cryptographic engine 310 using the first key 308.

Next, the encrypted data 314 and token 304 are sent 408 over a communication channel or to a shared media storage location 316, which is subsequently received or accessed by the second cryptographic module 303. Next, the token 304 and encrypted data 314 are received 410 by the second cryptographic module 303.

Next, the second key generator 318 generates 412 the second key 320, which is substantially identical to the first key 308, using the token 304 and KeyGen data 305. The structure and operation of the second key generator 318 is substantially the same as the first key generator 306 which is described in detail herein below.

Finally, the encrypted data 314 is decrypted 414 by the second cryptographic engine 322 using the second key 320 thereby providing an output plain message 324 that is substantially the same as the input plain message 312. The second cryptographic engine 322 is substantially the same in structure and operation as the encryption engine 310 as is the usual practice in conventional symmetric key systems.

Figure 6:
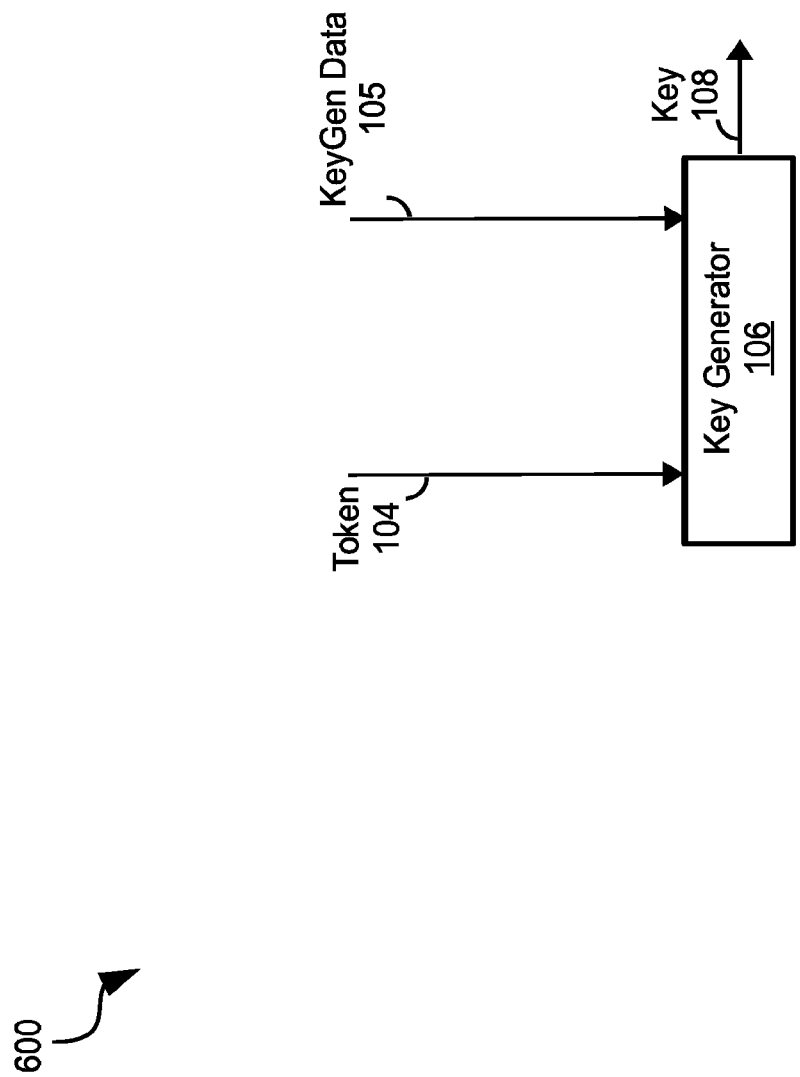
FIG. 6 is a block diagram of an embodiment of a key generator shown in FIG. 1A.

Referring now to FIG. 6, there is shown a block diagram of an embodiment 600 of KeyGen data 105 shown in FIG. 1. In this embodiment, token 104 is the first input and KeyGen data 105 is the second input. Key generator 106 utilizes token 104 and KeyGen data 105 to create key 108 for encryption and decryption. Key generator 106 can have various embodiments include being a random number generator. Additional embodiments are set out below.

Referring now to FIG. 6A, there is shown a block diagram of an embodiment 600A of KeyGen data 105 shown in FIG. 1. In this embodiment, KeyGen data 105 is a fixed string of data bits 602. In this embodiment, the fixed string of data bits 602 would be used as a second input to a key generator 106A along with the token 104 as the first input. The output of the key generator 106A would be a random string of bits from which a set of those bits can be deterministically selected as the key 108 for encryption and decryption.

Referring now to FIG. 6B, there is shown a block diagram of an additional embodiment 600B of KeyGen data 105 shown in FIG. 1. In this embodiment, KeyGen data 105 are bits 614 from an entropy space 612. In operation, entropy bits 614 from the entropy space 612 are selected by key generator 106B based on input from token 104 to create a second, reproducible string of random bits.

Figure 7:
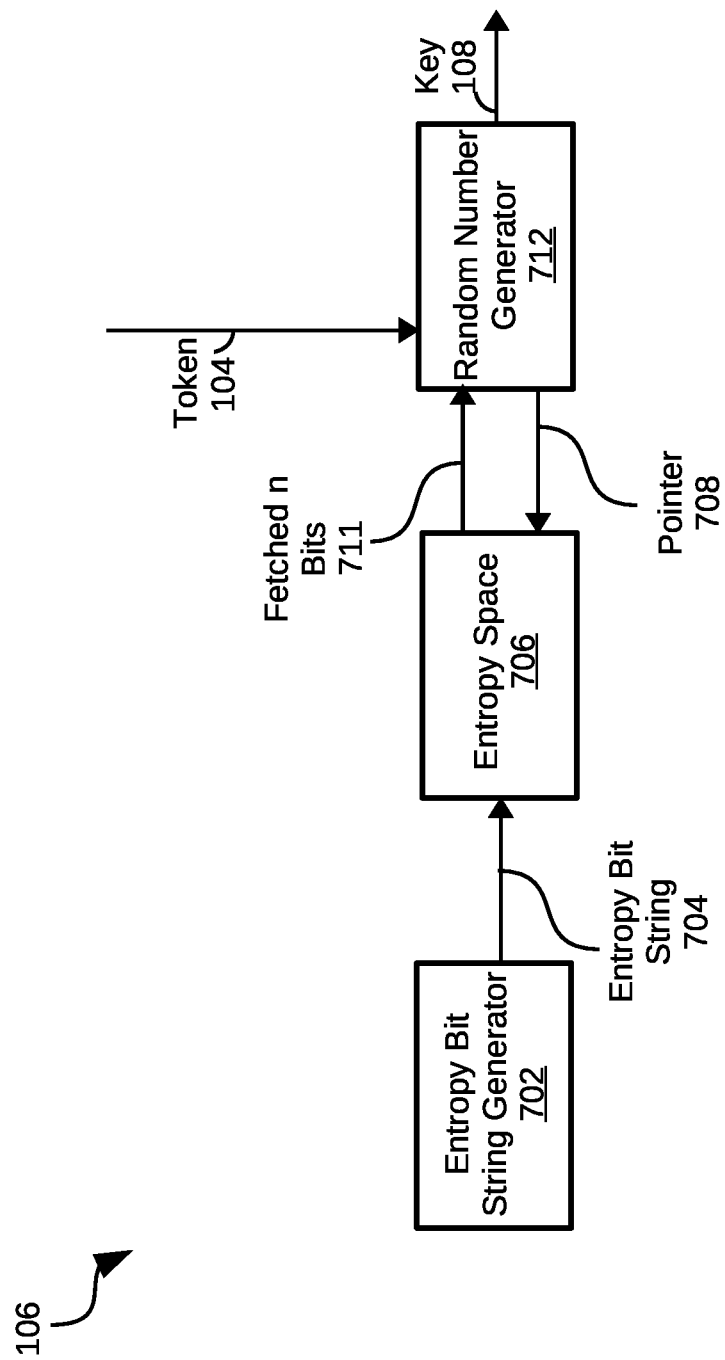
FIG. 7 is a block diagram of an embodiment of a key generator shown in FIG. 1A.

Referring now to FIG. 7, there is shown a block diagram of an embodiment of key generator 106 shown in FIG. 1.

The key generator 106 includes an entropy bit string generator 702 for generating an entropy bit string 704. The entropy bit string 704 is stored in an entropy space 706. The entropy bit string 704 includes a large set of random digital information. It can be of variable size and variable content among different instantiations of the system. Its primary characteristic is that the content is completely random digital information (i.e. random 1's and 0's). Although the entropy space 706 must be static in any one instantiation of the system 100, the entropy space 706 can take different forms in different instantiations of the system 100. The random number generator 712 uses a pointer 708 to extract n bits from the entropy space 706. To ensure a random selection of bits is chosen from the entropy space 706, the random number generator 712 moves the pointer 708 to various locations in the entropy space 706 to fetch random bits.

In general, the random number generator 712 is a set of computer instructions whose execution sequence and output is dependent on the combination of the token 104 and the information contained in the entropy space 706. There are numerous different forms this random number generator can take in terms of computer programming instructions to achieve the desired outcome of generating a key that cannot be derived by knowing only the token. Although the random number generator must be static in any one instantiation of the system, the random number generator can take different forms in different instantiations of the system.

The random number generator 712 receives the token 104. The random number generator 712 generates the key 108 using the token 104 to calculate changes in the pointer 708 position to fetch random bits from the entropy space 706. Further details of the random number generator 712 are described herein below with reference to FIG. 8.

Figure 8:
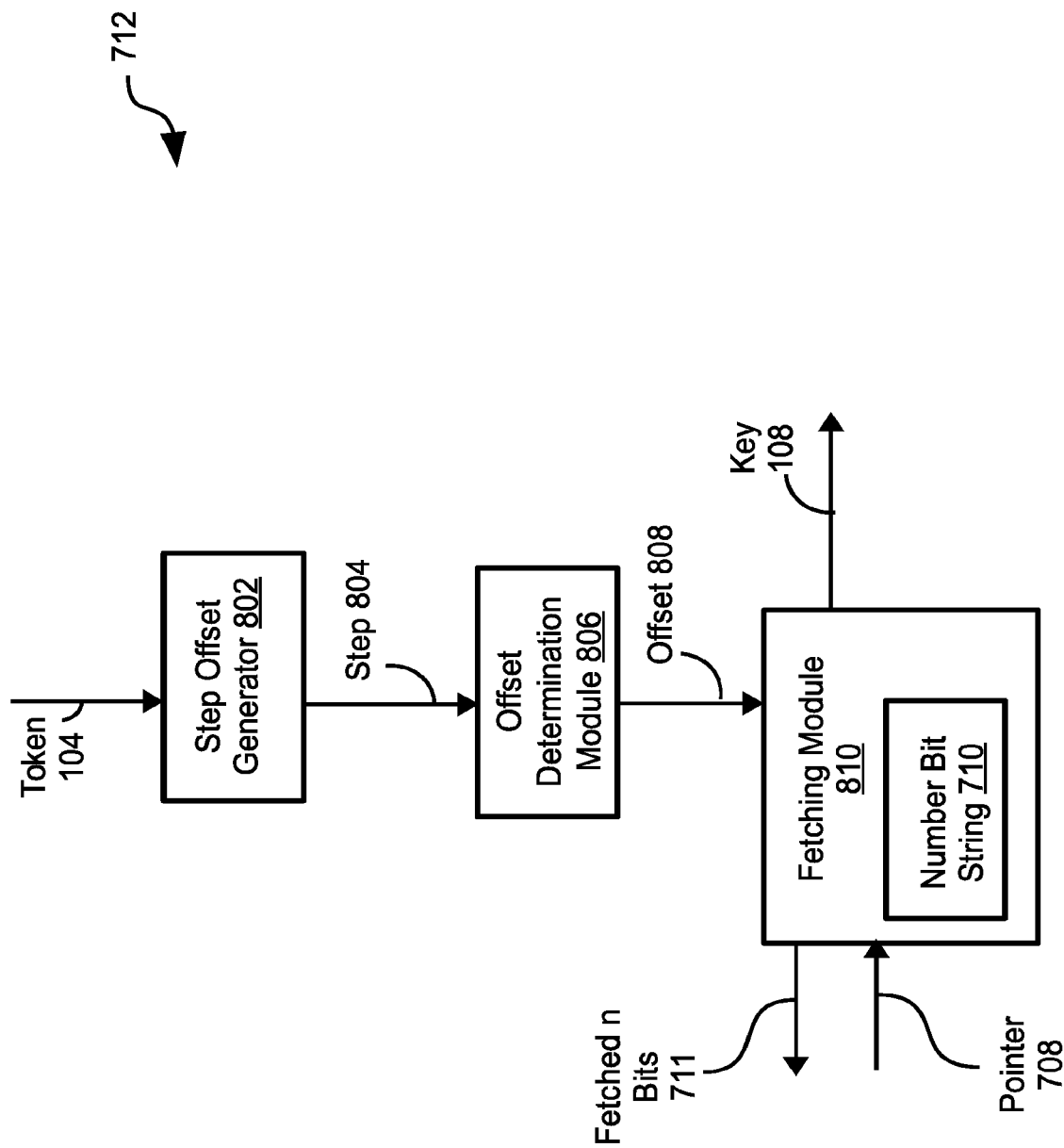
FIG. 8 is a block diagram of an embodiment of a random number generator shown in FIG. 7.

Referring to FIG. 8, there is shown a block diagram of the random number generator 712 shown in FIG. 7. The random number generator 712 includes a step offset generator 802 that receives the token 104 and calculates a step 804. The step 804 is a number generated from the token 104 (alternatively, it could be passed in as a parameter) that defines a length of each step taken in the entropy space 706 using the pointer 708. The step 804 can be calculated using MOD arithmetic to be a number within the length of the entropy space 706, although this approach should be considered as only one example of a choice for the step size for the sake of having an example solution.

The random number generator 712 also includes an offset determination module 806 for determining an offset 808 for moving the pointer 708 position in the entropy space 706. This offset 808 could be used to modify the size of the step each time the pointer 708 is moved in the entropy space 706. As an example, after the first fetching of bits from the entropy space 706, each subsequent fetching of bits could use the bits just fetched in calculating an offset 808 to the next step 804 for moving the pointer 708 to various positions in the entropy space 706. For instance, if the bits just fetched represent an even number, the offset 808 could be added to the step 804 for moving the pointer 708. Alternatively, if the bits just fetched represent an odd number, the offset 808 could be subtracted to the step 804 for moving the pointer 708.

The random number generator 712 also includes a fetching module 810 for fetching the n bits 711 using the pointer 708 generated from the step 804 and offset 808. When all bits are fetched from the entropy space 706, a number bit string 710 is produced, ultimately providing the key 108 based on the fetched n bits 711.

Figure 9A:
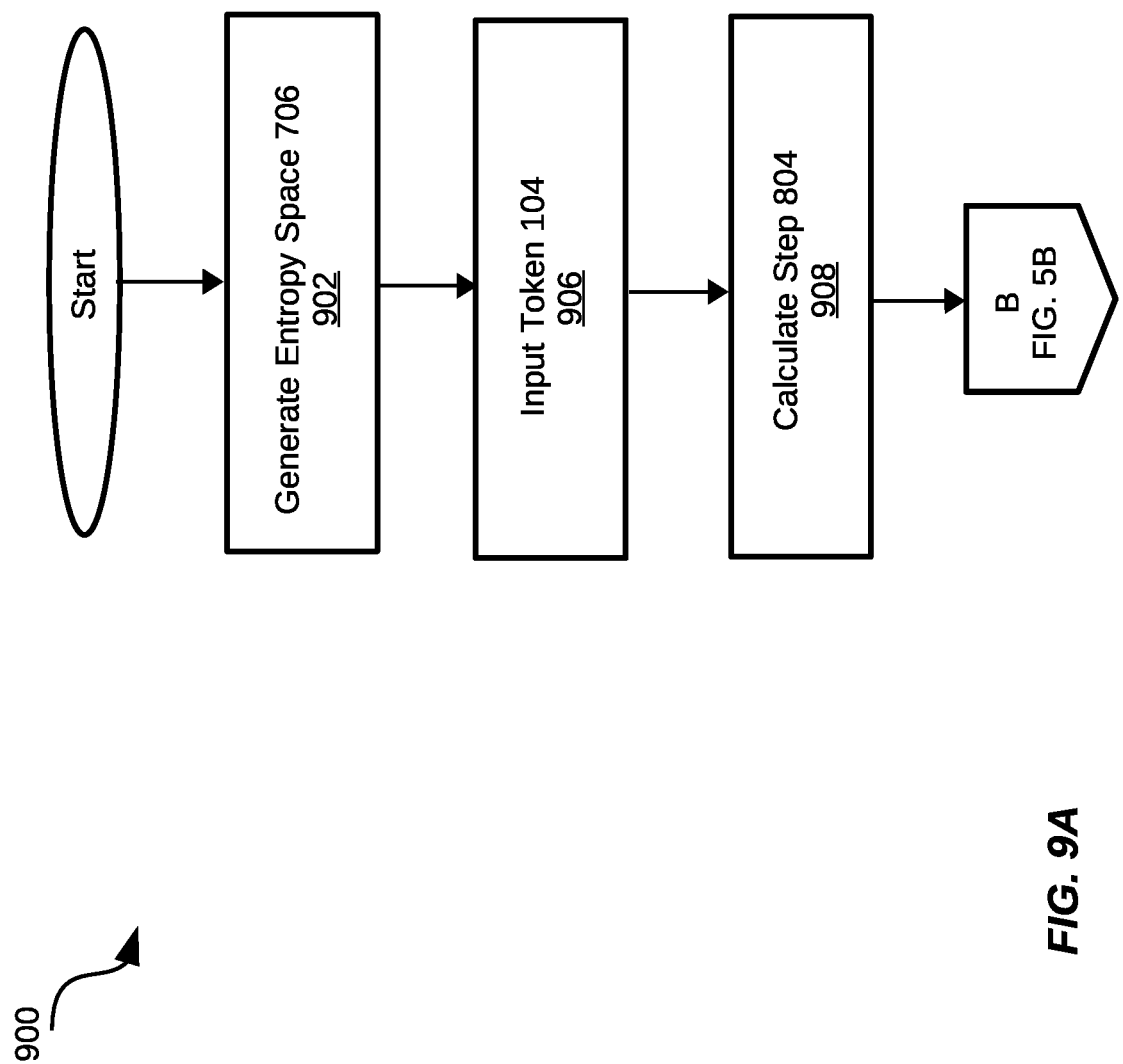
FIG. 9A is part of a flowchart of a method for generating a key utilizing the key generator in FIG. 7 in accordance with the embodiment of the present invention.
Figure 9B:
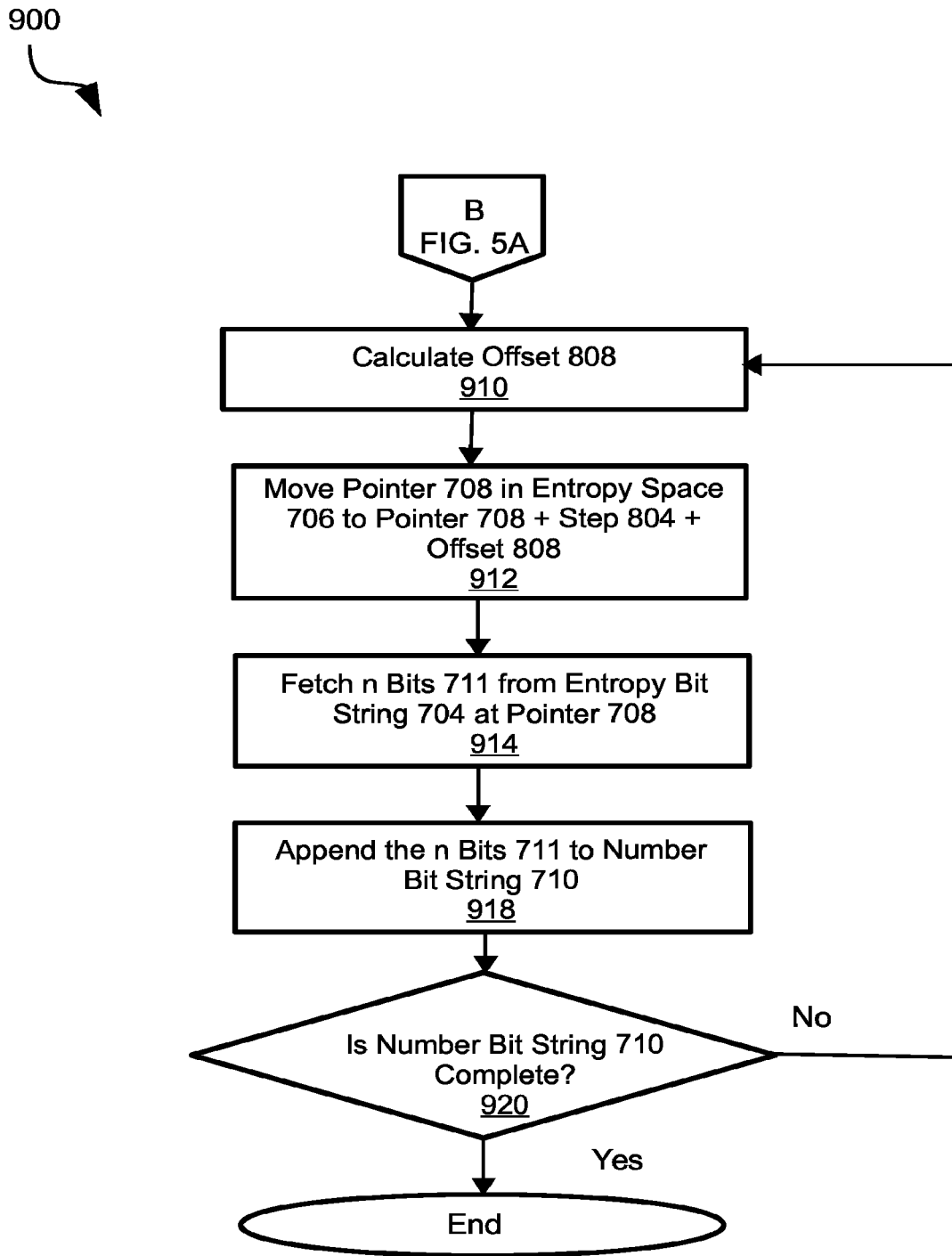
FIG. 9B is part of a flowchart of a method for generating a key utilizing the key generator in FIG. 7 in accordance with the embodiment of the present invention.

Referring now to FIGS. 9A and 9B there is shown a flowchart 900 of a method for generating the key 108 in accordance with the embodiment of the present invention.

First, the entropy space 706 is generated 902. Entropy space is based on entropy bit string 704 which may be generated from the Web site RANDOM.ORG( ) or any other means for generating random numbers known in the art.

The token 104 is then input 904 to the random number generator 712, where the step 804 and offset 808 are calculated 908, 910. Next, the pointer 708 in the entropy space 706 is moved 912 to pointer 708 plus step 804 plus offset 808.

Next, n bits 711 from the entropy space 706 at the pointer 708 is fetched 914 and are appended 918 to the number bit string 710.

Provided the number bit string is complete 920, the number bit string 710 becomes the key 108 and the method is finished, otherwise execution returns to step 910. In the disclosure, complete is defined by collecting at least enough bits for a key. If more bits are collected than the number needed for a key, the number bit string 710 would have to be translated into a key.

Figure 10:
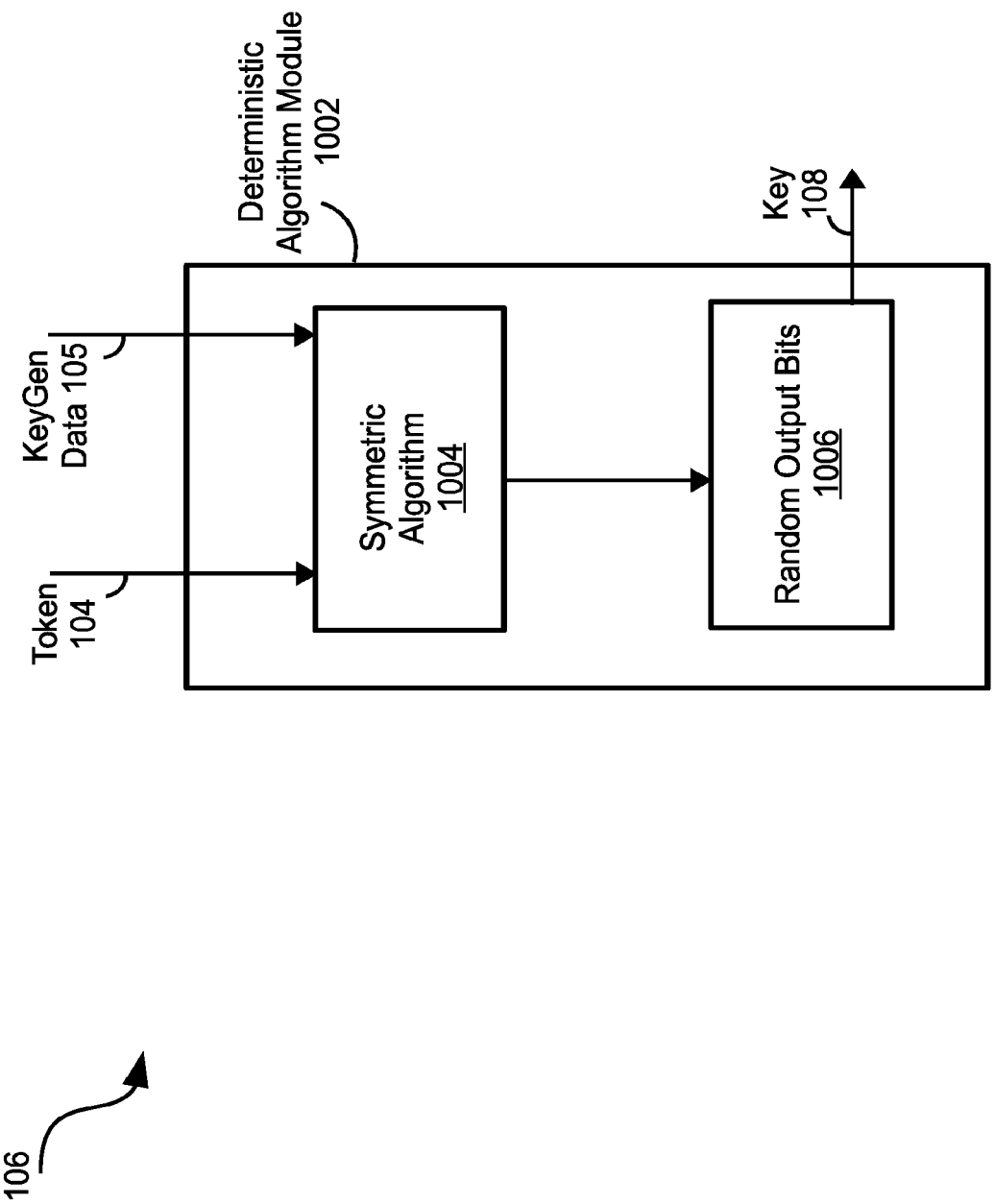
FIG. 10 is a block diagram of an additional embodiment of a key generator shown in FIG. 1A.

Referring now to FIG. 10, there is shown a block diagram of an additional embodiment of key generator 106 shown in FIG. 1.

In this embodiment, key generator 106 is shown as a deterministic algorithm module 1002 using a symmetric algorithm 1004 for generating random numbers. Unlike traditional hardware and software-based random number generators, which cannot be used to reliably re-generate previously generated random numbers, the symmetric algorithm 1004 will generate and re-generate the same random number based on two input parameters, a token 104 and fixed, static KeyGen data 105 as the data input to the symmetric algorithm 1004. Symmetric algorithm 1004 utilizes token 104 and KeyGen data 105 to create a random output 1006, referred to as random_output_bits. This random output 1006 is then utilized to create key 108. For example, deterministic algorithm module 1002 may select every $4^{th}$ or $5^{th}$ value from random output 1006 to create key 108.

By utilizing token 104 in combination with KeyGen data 105, the resulting random output 1006 is created in such a way that it is difficult to correlate the token 104 with the random output 1006 without knowing the intimate details of the deterministic algorithm module 1002. This allows token 104 to be stored and shared in a non-secret manners (e.g., over a public network). With KeyGen data 105 being kept secret, the ability of an attacker to determine the encryption key from the corresponding token is rendered highly unlikely. Symmetric algorithm 1004 by be any type of standard encryption algorithm, such as the Triple-Data Encryption Standard (Triple-DES) or the Advanced Encryption Standard (AES).

Figure 11:
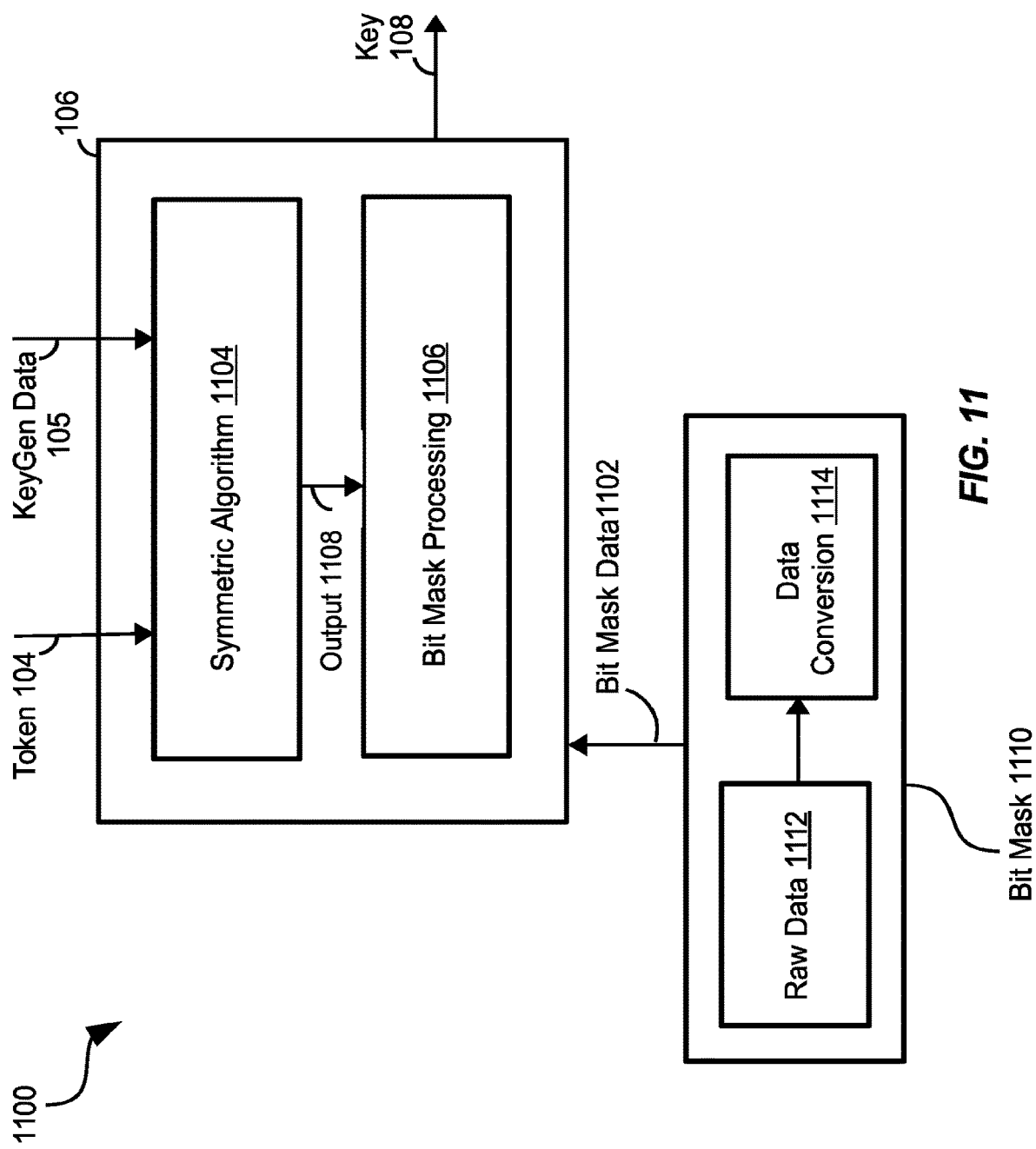
FIG. 11 is a block diagram of an embodiment of a key generator shown in FIG. 1A.

Referring now to FIG. 11, there is shown a block diagram of an additional embodiment of key generator 106 shown in FIG. 1. In this embodiment, key generator 106 is configured to receive token 104 and KeyGen data 105 as previously discussed. Key generator 106 also receives a third input, referred to as bit mask data 1102. The three inputs, e.g. token 104, KeyGen data 105 and bit mask data 1102, are utilized by key generator 106 to create reproducible key 108.

In this embodiment, key generator 106 has a symmetric algorithm component 1104 that processes token 104 and KeyGen data 105. The output 1108 thereof is processed in combination with bit mask data 1102 to further randomize key 108.

In general, bit mask data 1102 is a set of bits that can be applied to another set of bits using a bit mask processing operation 1106, such as exclusive-or (XOR) operation, other similar single operations, or an algorithm using multiple operations.

In this embodiment, bit mask processing 1106 utilizes an XOR operation. In operation, each bit of the original data is compared to a corresponding bit of the bit mask data 1102 in sequence. The XOR operation, as illustrated in FIG. 12, works as follows:

If there is a 1 in the output data 1108 and a 1 in the bit mask, the result is a zero;

If there is a 0 in the output data 1108 and a 0 in the bit mask, the result is a zero;

If there is a 0 in the output data 1108 and a 1 in the bit mask, the result is a one; and If there is a 1 in the output data 1108 and a 0 and the bitmaps, the result is a one.

The addition of bit mask data 1102 in key generator 106 provides an additional source of randomness making it more difficult for an attacker to reverse engineer random number generator 106. As with the previous embodiments, only one of the token 104, KeyGen data 105 or bit mask data 1102 needs to be not publicly available, although the most secure configuration would minimize information that is publicly available. For example, as discussed, it may be optimal to enable the token 104 to be publicly available. In such a case, the most secure configuration would be to ensure the KeyGen data 105 and bit mask data 1102 were not publicly available.

Further, bit mask data 1102 may be created manually by a user or algorithmically by a piece of software or hardware by accessing some data. For example, a user could manually type in a long passphrase that is used directly as a bit mask itself (using the binary form of the characters entered). Alternatively, a piece of software or hardware could take a static, fixed data file, for example a picture, document, spreadsheet etc., as input and convert the data file algorithmically and deterministically into a bit mask 1110. In this embodiment, for example, raw data 1112 is provided into data conversion algorithm 1114 where it is converted into bit mask data 1102 for use with bit mask processing.

Further, modification to token 104, KeyGen data 105 and/or bit mask data 1102 can effectively create different keys 108. By employing the bit mask data 1102, system 100 increases security and provides an additional flexible system component that may be changed to achieve different random results. For example, an organization may use different bit masks for different types of data, e.g. emails, documents, spreadsheets etc. while maintaining the other elements of key generator 106 the same.

The use of a single bit mask data 1102 is illustrative. Those skilled in the art will recognize that multiple bit masks may be utilized and are within the scope of the present invention.

Figure 13:
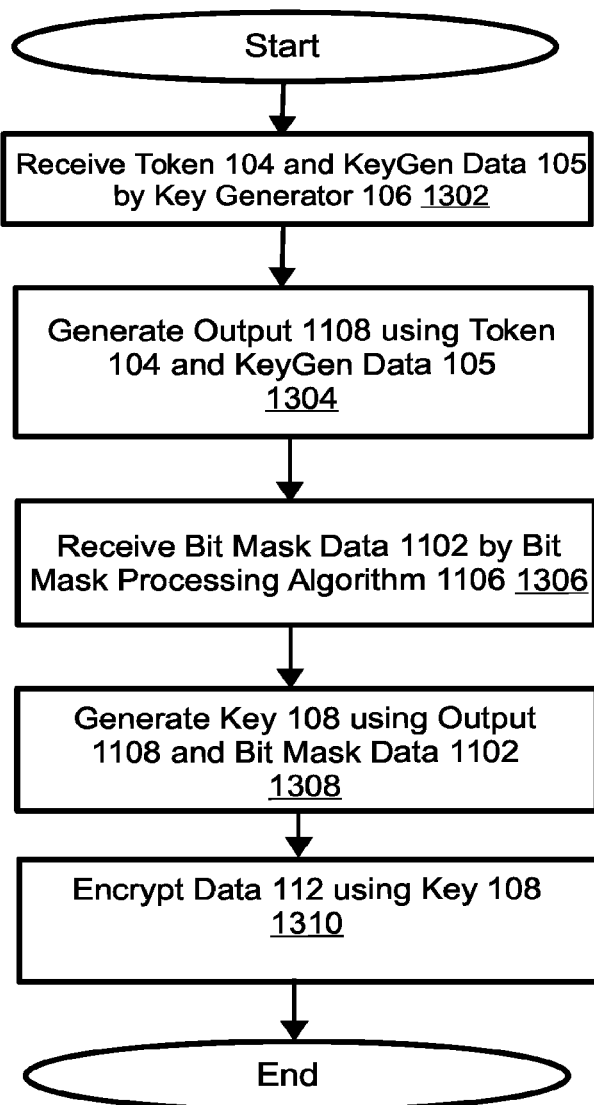
FIG. 13 is a flowchart of a method for encrypting data utilizing the key generator shown in FIG. 11 in accordance with the embodiment of the present invention.

Referring now to FIG. 13 there is shown a flowchart 1300 of a method for encrypting data in accordance with an embodiment of the present invention.

First, token 104 is received 1302 by cryptographic module 102. Token 404 may be generated, as set out above, if this is the token's initial use as input to the key generator 106. If token 104 has previously been generated and stored in a storage device, cryptographic module 102 may receive token 104 from that storage device.

Next, output 1108 is generated 1304 using token 104 and KeyGen 105 by symmetric algorithm 1104. Bit mask data 1102 is then received 1306 and processed in combination with output 1108 by bit mask processing algorithm 1106 to generate 1308 key 108.

Next, the input data 112 is encrypted 1310 into encrypted data 114 by the cryptographic engine 110 using key 108.

Figure 14:
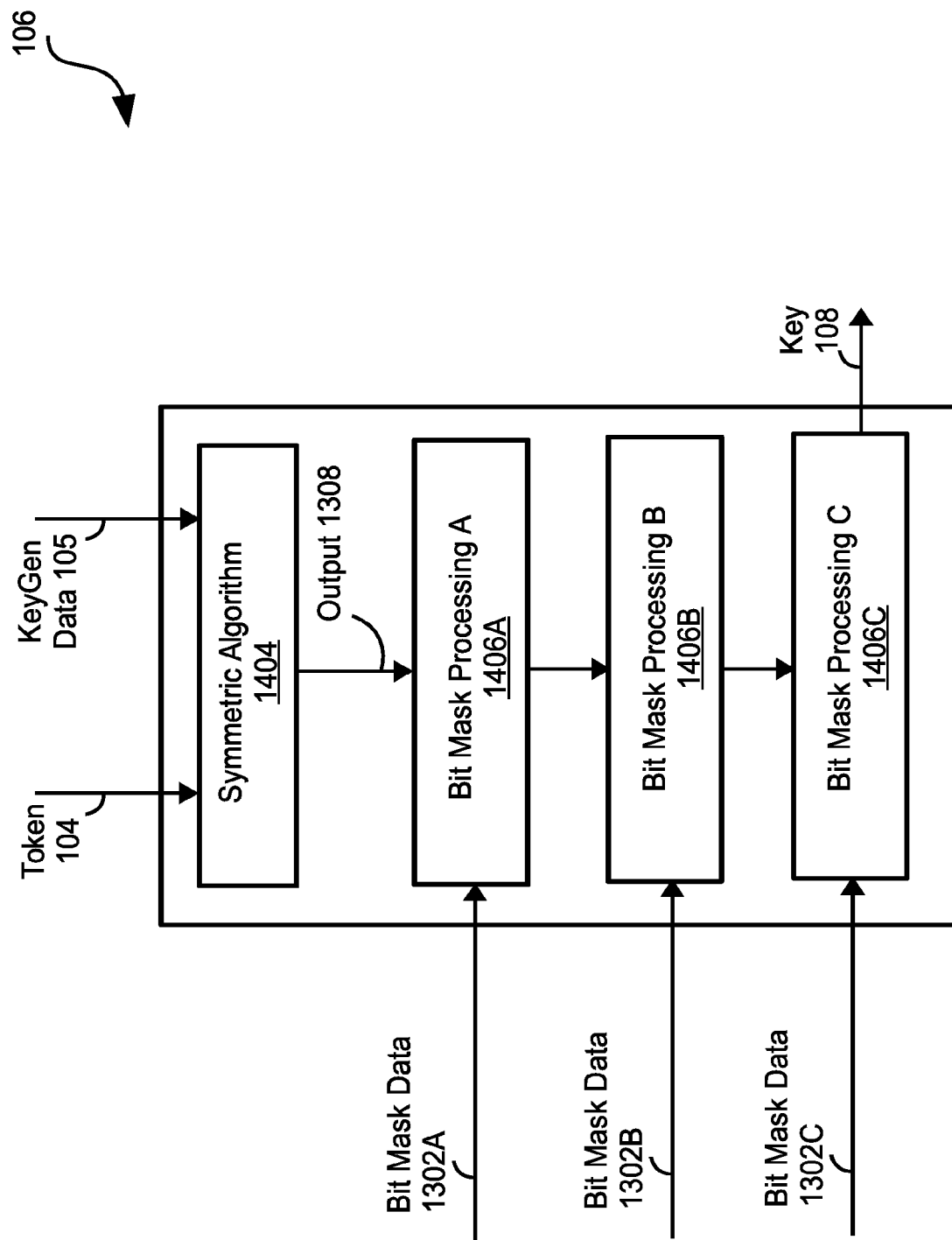
FIG. 14 is a block diagram of an additional embodiment of a key generator shown in FIG. 1A.

Referring now to FIG. 14, there is shown a block diagram of an additional embodiment of key generator 106 shown in FIG. 1. In this embodiment, key generator 106 is configured to receive token 104 and KeyGen data 105 as previously discussed. Key generator 106 also receives a plurality of third inputs, referred to as bit mask data 1302A, 1302B and 1302C. The inputs, e.g. token 104, KeyGen data 105 and bit mask data 1302, are utilized by key generator 106 to create a reproducible key 108.

In this embodiment, key generator 106 has a symmetric algorithm component 1104 that processes token 104 and KeyGen data 105. The output 1308 thereof is processed in combination with bit mask data 1302 to further randomize key 108.

In this embodiment, bit mask data has a plurality of individual bit mask data 1302A, 1302B, and 1302C that are individually, sequentially applied to output 1308 using bit mask processing operations 1306A, 1306B and 1306C, where each operation may be an exclusive-or (XOR) operation, other similar single operations, or an algorithm using multiple operations, including various logical operations.

This embodiment illustrates multiple bit masks being utilized with the present invention.

In an application of embodiments of the present invention, if multiple bit masks were used and one or more of the bit masks was purposely destroyed (non-recoverable or not used any longer), the result would be to render all of the information encrypted with keys generated using the destroyed bit mask(s) unrecoverable. This is referred to as digital shredding. It is also possible to achieve digital shredding by destroying other components of a deterministic algorithm module, not only bit masks; for example, the KeyGen data could be destroyed to also achieve digital shredding.

An efficient implementation of bit masks generated from data would be to generate the bit masks using a data conversion algorithm and then store the result of the conversion (e.g., in memory or in storage media) for use in the cryptographic module, rather than doing the conversion each time the cryptographic module is executed.

Further, it is also possible to create a multi-variable system employing multiple bit masks. For example, a service provider could offer the option for customers to create their own, personalized bit masks and the organization would use each specific customer's personalized bit mask when securing that customer's data. However, since the use of a personalized bit mask could be optional, the organization would apply an initial, global bit mask for all secure data, to ensure that data was properly secured even if the customer was not using the option to have a personalized bit mask.

After applying the global bit mask, the service provider could then apply the customer's personalized bit mask if the customer selected the option to do so. A customer who chose the option to use a personalized bit mask could delete their personalized bit mask and, in so doing, ensure that all data encrypted with keys generated using the personalize bit mask could not be reproduced—achieving personalized digital shredding, which could be highly valuable from a privacy perspective.

Figure 15:
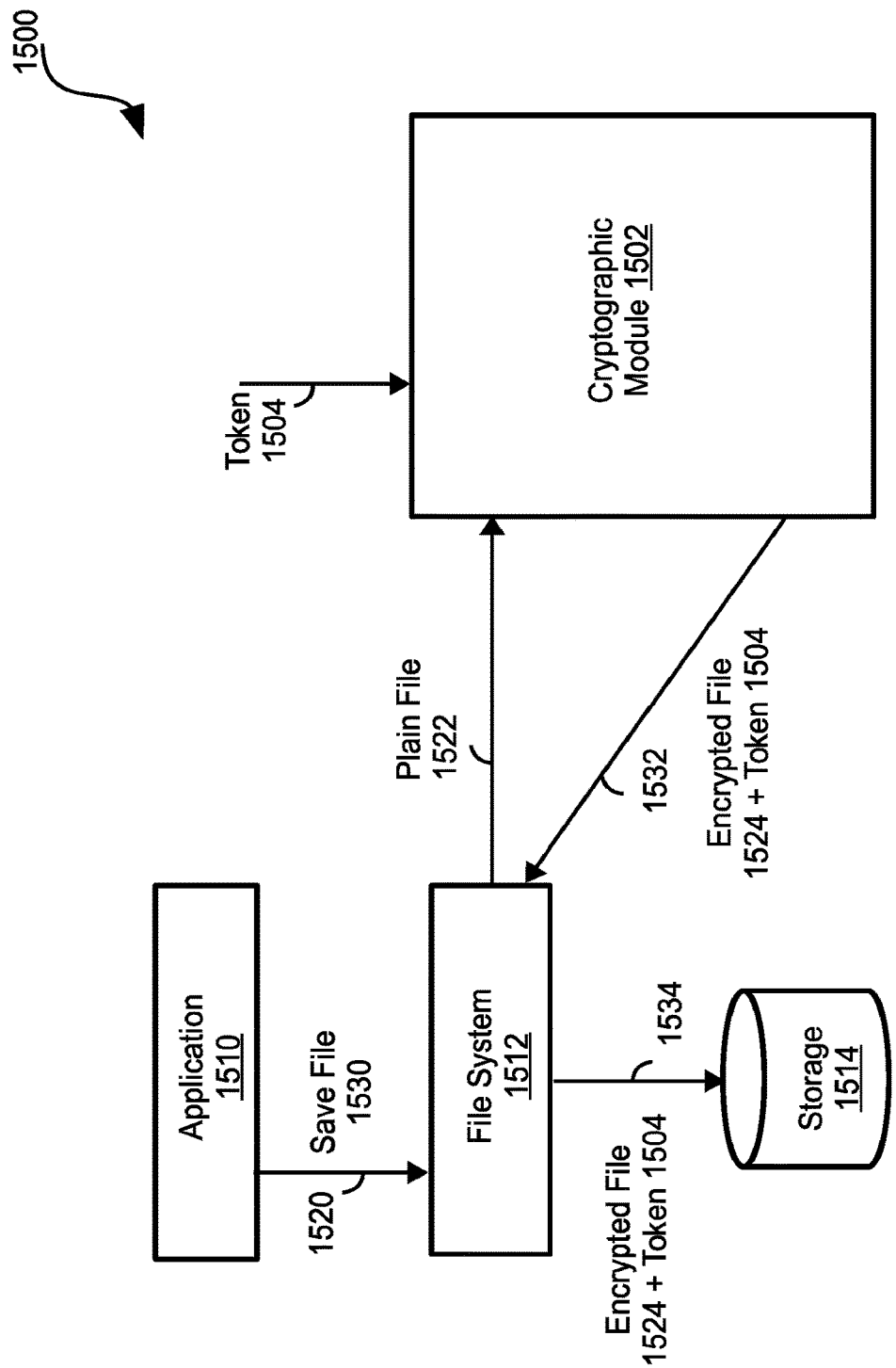
FIG. 15 is a schematic diagram of an embodiment of an application of the embodiments of the present invention.

Referring to FIG. 15, an embodiment of the system is shown in operation performing file encryption. This embodiment provides a transparent system to encrypt/decrypt all files on a storage device using a unique encryption key for each file, without the need to store these encryption keys securely.

In operation, application 1510 sends a command to file system 1512 to save 1520 File 1530. File system 1512 can be a command system such as an operating system. Application 1510 may be any application that creates or otherwise modifies a document, e-mail, spreadsheet, etc. Upon receiving the save command 1520, a plain text version of File 1530 is provided to cryptographic module 1502. Token 1504 is generated and is then utilized by cryptographic module 1502 to encrypt the plain text version of File 1530 to create an encrypted File 1524 as previously set out above. Encrypted File 1524 and token 1504 are provided 1532 to file system 1512 and stored 1534 in a storage device 1514. Storage device 1514 may be any data storage device such as a local memory storage, a local file server, or an Internet-based cloud storage service provided by an independent third-party (e.g., Google, Microsoft, Amazon, . . . ), etc.

Figure 16:
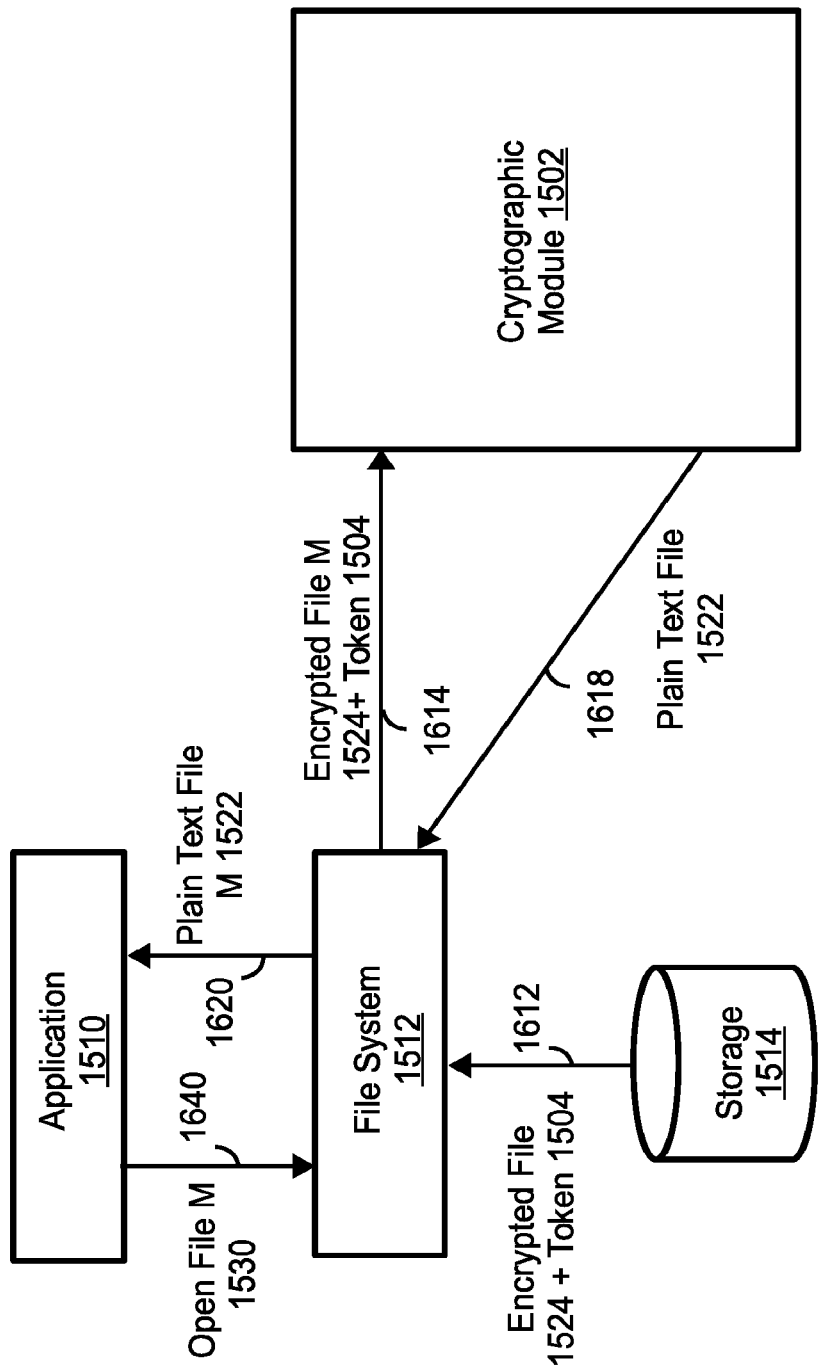
FIG. 16 is a schematic diagram of an additional embodiment of another application of the embodiments of the present invention.

Referring to FIG. 16, the embodiment of the inventive system as shown in FIG. 15, is shown in operation performing file decryption. In operation, application 1510 sends a command to file system 1512 to open 1610 File 1530. File system 1512 retrieves 1612 the encrypted File 1524 along with the related token 1504. File system 1512 provides 1614 token 1504 and encrypted File 1524 to cryptographic module where encrypted File 1524 is decrypted as previously provided to create plain text File 1522. Plain text File 1522 is then provided 1618 to file system 1512 where it is then provided 1620 to application 1510 for use.

Figure 17:
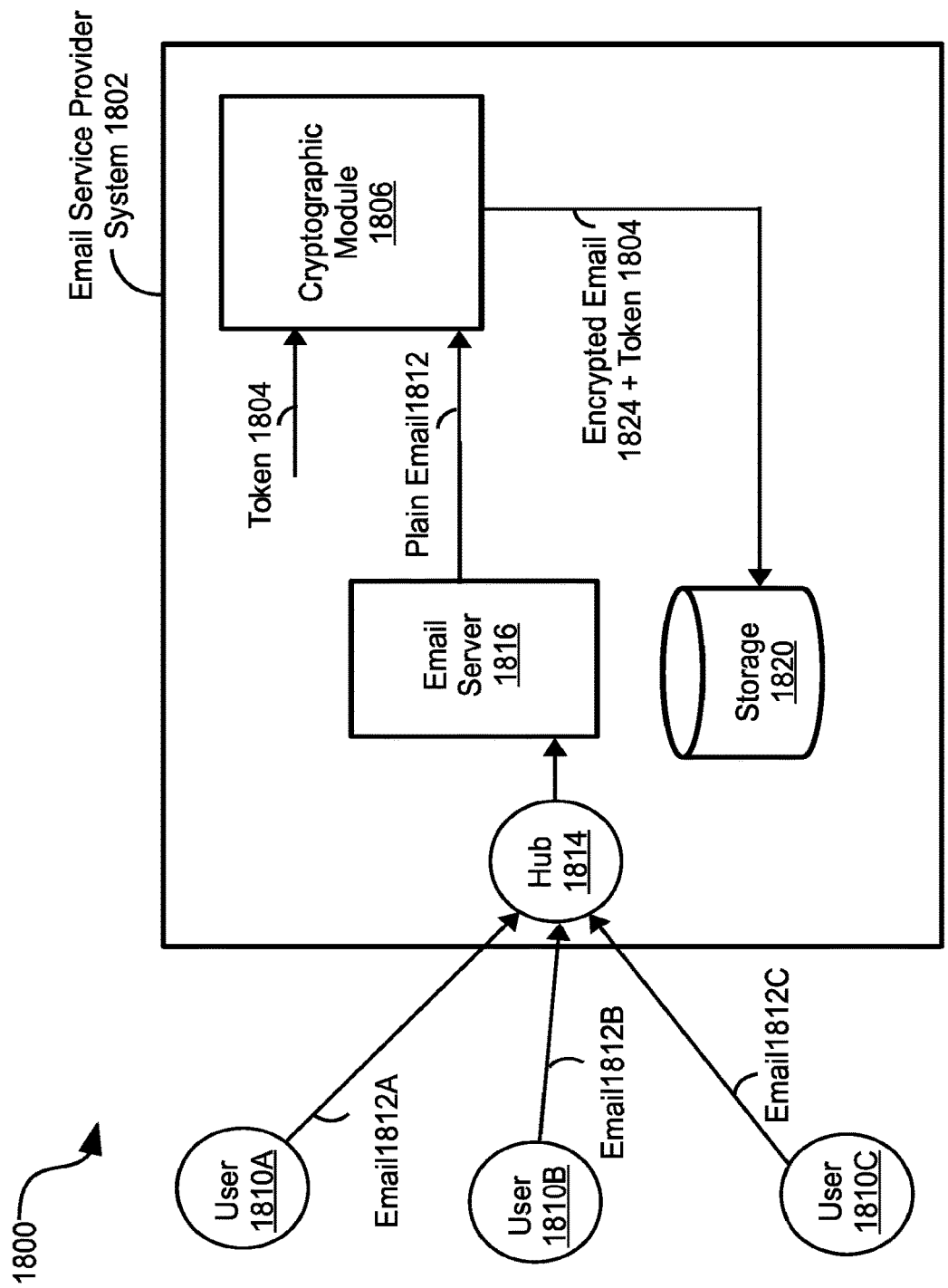
FIG. 17 is a schematic diagram of an additional embodiment of yet another application of the embodiments of the present invention.

Referring to FIG. 17, an embodiment of the inventive system is shown in operation within a one-to-many centralized service provider 1802 configuration. This configuration may be utilized when a centralized service provider desires to provide secure storage of data for a plurality of users of the service provider's services. For example, a centralized email provider 1802 may desire to provide secure storage of email messages on its servers.

In operation, users 1810A, B and C create and save multiple email messages 1812A, B and C that are routed to a service provider's email file server 1816. These email messages 1812 are in a plain text version of the email message. A plain text version of email 1812 is a non-encrypted version of that file. File server 1816 provides each plain text email 1812 to a cryptographic module 1806 for processing. Cryptographic module 1806 is capable of encrypting and decrypting data as set out above. It may include two or more inputs, i.e. token, KeyGen data, bit mask data, with at least one input being publicly available and at least one input being not publicly available.

For each plain text email 1812, a token 1804 is generated and is also provided cryptographic module 1806. Each plain text email 1812 is encrypted into encrypted email 1824, which are then stored in data storage 1820. Token 1804 may also be stored in data storage 1820. This example refers to a single email file server 1816. This is illustrative and not meant to be limiting. Those skilled in the art will recognize that other network configurations are within the scope of the present invention.

Figure 18:
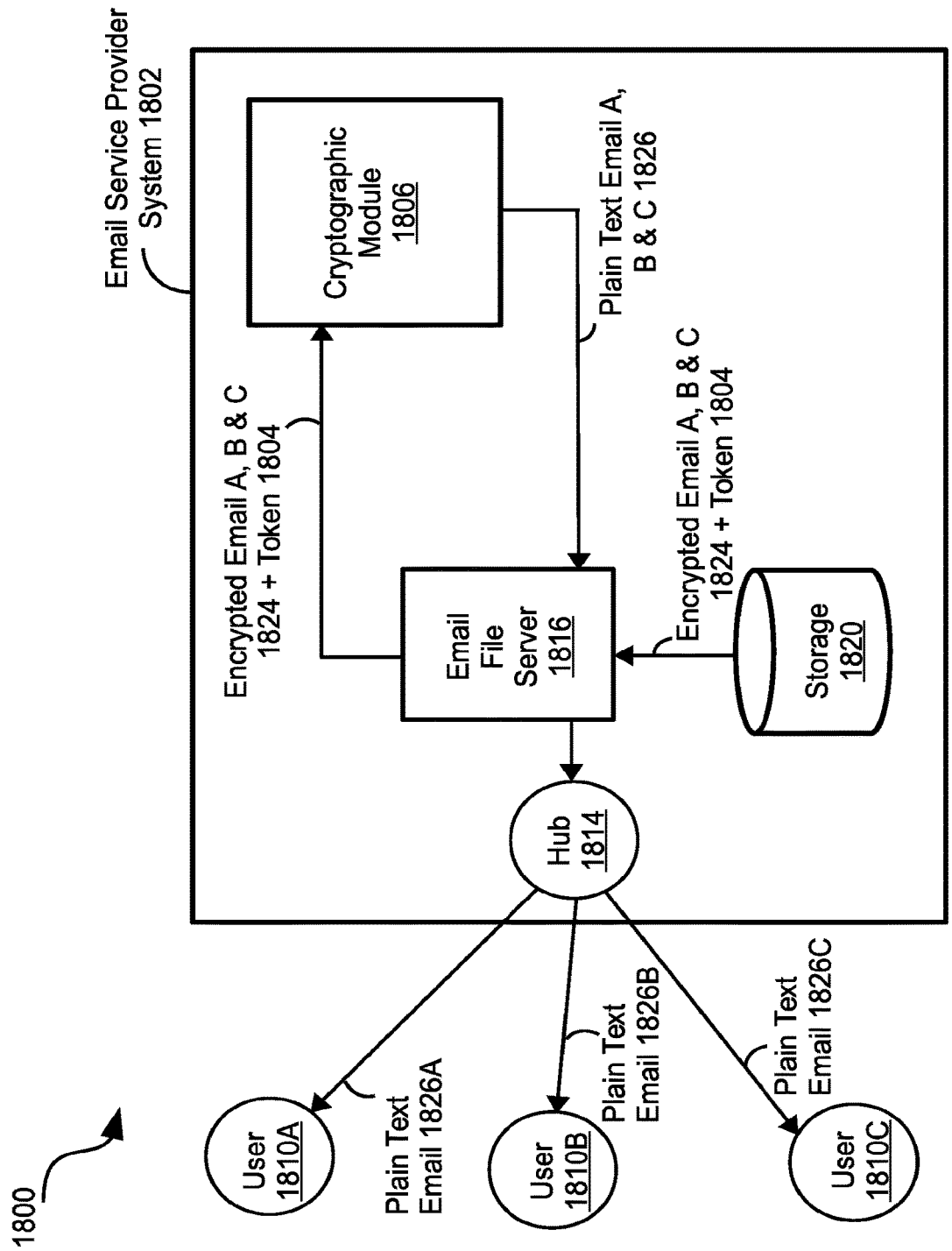
FIG. 18 is a schematic diagram of an additional embodiment of yet one more application of the embodiments of the present invention.

Referring to FIG. 18, the embodiment of the system as shown in FIG. 18 is illustrated in decryption operations.

In operation, when user's 1810A, B and C desires to read an encrypted email message 1824A, B and C, email service provider's email file server 1816 retrieves the encrypted version of email 1824 A, B and C and related token 1804 from data storage 1820. Token 1804 and encrypted email 1824 are provided to cryptographic module 1806. Encrypted email 1824 and token 1804 are processed resulting in plain text email 1824A, B and C, which is substantially identical to the original plain text email 1812. Plain text email 1824 is then provided to email file server 1816 allowing access by user 1810.

In alternative embodiments, individual bit masks may be associated with each user 1810 through a personal data file, for example a deterministically calculated data file based off of a photograph of the individual. The individual bit masks may be used in combination with or separate from a global bit mask thereby providing provides additional security for an individual's data. In the event that an individual does not have an individual bit mask, only the global bit mask would be utilized.

Figure 19:
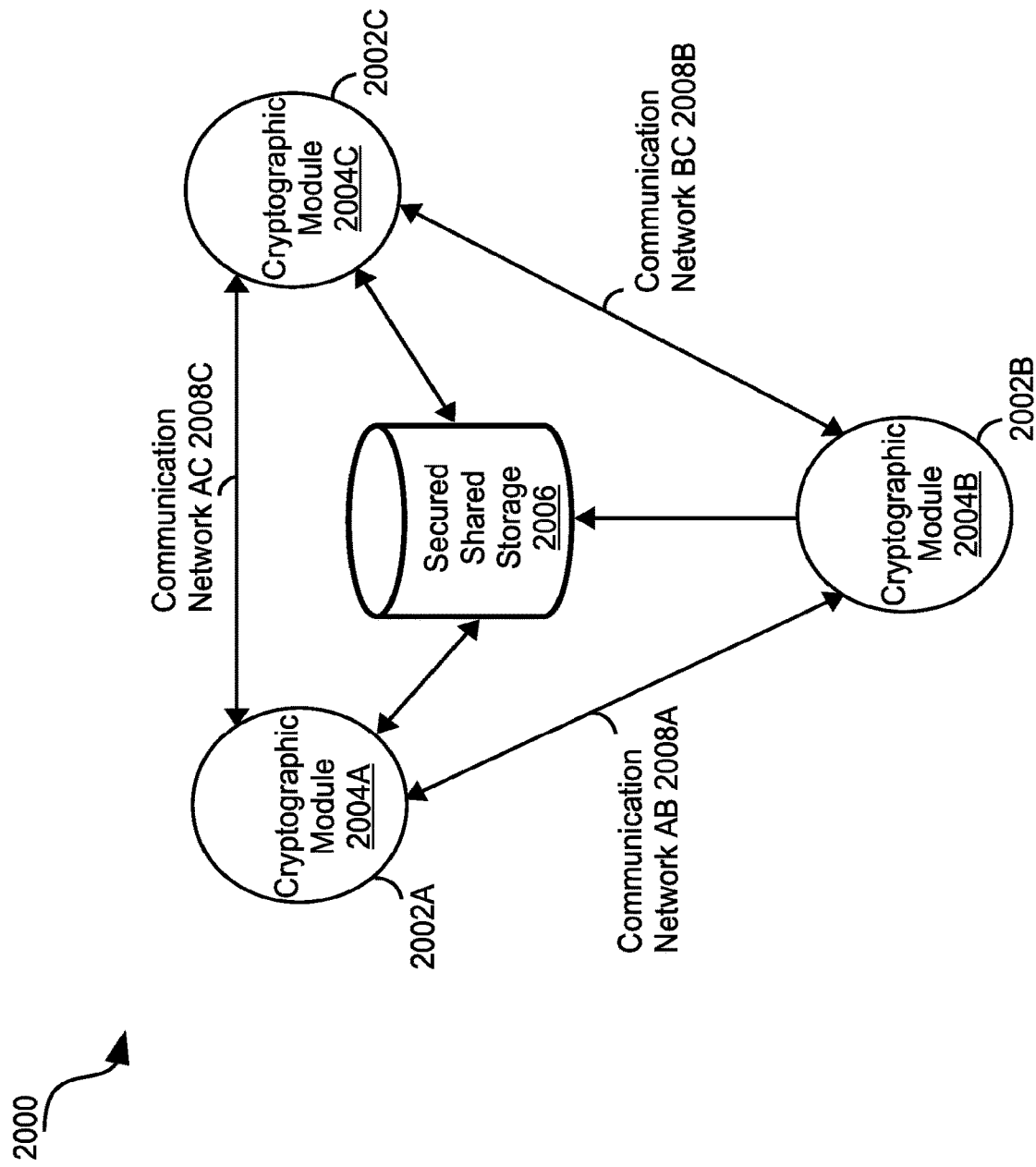
FIG. 19 is a schematic diagram of an additional embodiment of yet one further application of the embodiments of the present invention.

Referring to FIG. 19, an embodiment of the inventive system is shown in operation within a many-to-many decentralized configuration. This configuration may be utilized when it is desired to provide secure documents to two or more users. For example, a banking system having multiple locations 2002A, B and C may desire to provide secure information across its system.

In this embodiment, a banking system 2000 has a plurality of locations 2002A, B and C, each being part of a communication network 2008AB, BC and AC. This use of a communication network is illustrative and not meant to be limiting. Those skilled in the art will recognize that any suitable communication system capable of transmitting data is within the scope of the present invention.

Each location 2002A, B and C has a cryptographic module 2004A, B and C. Each cryptographic module 2004A, B and C is structurally and functionally as previously discussed.

Further, each location 2002A, B and C are in secured communication with shared storage 2006 which is configured to store encrypted data and token data. By having access to shared storage 2006, each location 2002A, B and C is capable of encrypting and decrypting the same data files across the communication network. While this embodiment utilizes a shared storage, this is illustrative and not meant to be limiting. Those skilled in the art will recognize that the encrypted data and token data may be transferred directly between the multiple locations without utilizing a storage device.

An application of the present invention would be to create a trusted computing system with tamper detection capabilities. By implementing embodiments of the present invention, if tampering is detected, the embodiment could be destroyed by destroying one or more of the inputs, i.e. token, KeyGen data, bit mask data for the embodiment. This destruction would minimize the chance of any secrets of the embodiment being determined by an attacker, which is highly valuable in many circumstances. If such a destruction occurred, one significant benefit of these embodiments is that the system could be reconstructed and all of the keys would be "recovered". This is substantially different from a key storage approach where, if the key storage is destroyed for any reason (including purposely destroying it because of an attack), all of the keys are lost forever.

An additional application of the present invention would be to create a hot standby network. By implementing embodiments having at least two locations, the handling of encryption/decryption could be maintained across an "operational" and "hot standby" network. Because traditional approaches using stored keys makes it is almost impossible to guarantee compatibility for encryption/decryption across operational and hot standby networks, embodiments of the present invention allow additional functionality over the prior art.

An Example of the Method of Generating a Random Number

The example method presented below is an example of an algorithm for generating smaller random numbers, in according to embodiments of the present invention. To generate larger random numbers, the algorithm could be effectively the same, but the size of the ENTROPY_BIT_STRING would be increased and, instead of picking up 2 bits at a time (as in this example), a larger-scale algorithm could pick up a byte (or more) at a time from the ENTROPY_BIT_STRING.

This algorithm meets the requirements of being able to regenerate the same random number from a "TOKEN" (a separate number), but it would have to be "scaled up" to generate random, symmetric cryptographic keys, for example.

Variable Definitions:

"ENTROPY_STRING"— the random string (array) of bits of length 2p.

"TOKEN"— a number used as input to the algorithm; typically, we expect the TOKEN to be generated by a regularly available pseudo-random number generator on operating systems and hardware.

"STEP"— a number generated from the random TOKEN (alternatively, it could be passed in as a parameter) that defines the length of each step taken in the ENTROPY_STRING; STEP is sized using MOD arithmetic to be a number within the first half of the length 2p.

"ES_POSITION"— defines the bit position in the ENTROPY_STRING.

"OFFSET"— used when walking through the ENTROPY_STRING picking up 2 bits at a time; also used to offset the next STEP into the ENTROPY_STRING (forward on even number loops and backward on odd number loops).

"NUMBER_LENGTH"— the number of bits in NUMBER_BIT_STRING.

"NUMBER_BIT_STRING"— a linear array of bits of length RN_LENGTH.

"LOOPS_MAXIMUM" AND "LOOPS_COUNTER" control the number of loops executed.

"ONE_TIME_SEED"—may also be referred to as a bitmask and is entered at run-time as an 8-bit Hexadecimal number (for the purposes of this example algorithm, but it could be much longer, depending on the circumstances). The ONE_TIME_SEED may be Bit Mask as set out above, which may be provided, or directed to, or supplied with data from which a Bit Mask could be algorithmically, deterministically generated/regenerated.

Constants:

P=10.

For this example algorithm, ENTROPY_BIT_STRING is defined to 1024 bits long. Each row in the following list contains 128 random bits (in hexadecimal format), generated from the Web site RANDOM.org (https://www.random.org/bytes/). Although the presentation is in row format in this document for readability purposes only, the ENTROPY_BIT_STRING is a long, contiguous string of bits in software.

ENTROPY_BIT_STRING=

40 5f 3f 88 2a 55 41 52 df f3 4c f6 77 95 3a 02 [1]
d1 31 16 0f fe 20 70 21 8c 93 88 8e 4e be 7a 4b [2]
7f 0c 7f 78 c1 51 c4 9d 91 79 a1 05 04 8c e1 89 [3]
f9 dd 38 65 5c 55 8a 92 43 16 5b 64 2e 1d 46 e3 [4]
9c 2f 4d 4e 9d 15 fe 84 10 a5 a5 f3 94 b5 34 6e [5]
e2 77 4e 5b 25 26 57 7b bf c1 3a 92 a3 8d 3f b2 [6]
e4 44 8f 6e da 25 e4 9f c2 7b 0e fc d0 82 f2 93 [7]
aa c5 6b 52 9f b0 d5 58 53 8b 7b 24 6b ae 86 eb [8]

NUMBER_LENGTH=8

For this example algorithm, numbers are generated having a length of 8 bits, but this could be any length, so long as it is divisible by 2 since 2 bits at a time are being picked up.

For numbers of a longer length, the size of the ENTROPY_BIT_STRING should also be increased (to increase the randomness) and, in such a case, the algorithm could be amended to pick up a byte (or more) at a time, rather than 2 bits at a time in this example algorithm.

Algorithm:
INPUT→TOKEN
INPUT→ONE_TIME_SEED
STEP=TOKEN MOD 2p−1

This ensures the initial STEP is within the first half of the ENTROPY_BIT_STRING, although this is arbitrary. The STEP value could be any number between 0 and (2p−1) and the algorithm would work just fine.

LOOPS_MAXIMUM=NUMBER_LENGTH/2

This number is looped a number of times to pick up NUMBER_LENGTH bits since 2 bits at a time are being picked up.

LOOPS_COUNTER=0
OFFSET=0
ES_POSITION=0
LOOP START:
IF LOOPS_COUNTER IS ODD, THEN OFFSET= OFFSET*(−1)
ES_POSITION=ABS((ES_POSITION+STEP+OFFSET) MOD 2p)

Take the Absolute Value of the ES_POSITION to cover the boundary condition where the value calculated inside the brackets is negative IF ES_POSITION=(2p−1) THEN
OFFSET=2 BITS AT ENTROPY_BIT_STRING[ES_POSITION] and ENTROPY_STRING[0]
ELSE
OFFSET=2 BITS AT ENTROPY_BIT_STRING[ES_POSITION] and
ENTROPY_STRING[ES_POSITION+1]
NUMBER_BIT_STRING[LOOPS_COUNTER*2]=2nd least significant bit in OFFSET
NUMBER_BIT_STRING[LOOPS_COUNTER*2+1]= least significant bit in OFFSET
IF (LOOPS_COUNTER*2+2) MOD 8=0 THEN
XOR(NUMBER_BIT_STRING[LOOPS_COUNTER−3)*2:LOOPS_COUNTER*2+1], ONE_TIME_SEED)
After every 8 bits are collected, XOR those 8 bits with the ONE_TIME_SEED
LOOPS_COUNTER=LOOPS_COUNTER+1
IF LOOPS_COUNTER<LOOPS_MAXIMUM THEN GO TO "LOOP START"
FINISH:
RETURN(NUMBER_BIT_STRING)

When the loops are done, the NUMBER_BIT_STRING will be full of NUMBER_LENGTH random bits picked up from the ENTROPY_BIT_STRING and combined with the ONE_TIME_SEED to generate further randomness.

General System Description

The keys generated by the system can be reliably and precisely reproduced by the system using the same tokens. However, knowledge of a token will not allow someone to generate the associated key without access to each of the entropy space, the one-time seed, and the random number generator. In fact, someone with knowledge of any of these combinations of components will be unable to reproduce a key:

a) token, random number generator, and entropy space, or
b) token, entropy space, one-time seed, or
c) token, random number generator, one-time seed.

In other words, so long as one of the random number generator, entropy space, or one-time seed is kept secret, it is not possible to derive the key from the "token". Ideally, the concept is to have the entropy space and random number generator be able to be known and the one-time seed be kept secret. This is the ideal configuration because the entropy space and the random number generator are static in nature (i.e., they could, in theory and in practice, be the same across multiple customer environments), whereas the one-time seed is only used once and is completely variable depending on the instance of use (meaning, the specific instantiation of a system).

Importantly, the system does not require external input (e.g., from a keyboard) at the time of generating or regenerating a key. Also important is the fact that the system does not (and likely cannot) require sources of entropy frequently or universally used in random number generation, such as time/date. The only required inputs to the random number generator are the token, the entropy space, and the one-time seed. With those inputs, the system will re-generate the same key as initially generated after the initial generation of the token.

Often, the current time/date, or some other variable that changes over time, is used to provide some randomness (or "entropy") in the process of creating a computer-generated random number. Embodiments of the invention cannot use that type of input because doing so would make regenerating a key from a "token" impossible. A "token" and associated key created at time t1 would not be possible to re-generate at a later time, t2, if the current time/date was used to create randomness in the random number generation process.

While it is possible to include additional parameters in the generation/re-generation process, there is no requirement to do so. For example, it could be possible to require additional input from a human to generate/regenerate the key. The main requirement of any such input(s), however, is that it/they would have to be identical on the initial generation of the key and all subsequent re-generation(s) of the key.

System Construction and Run-Time Usage

Time Zero:

1) Construct random number generator—this is a set of computer programming instructions that uses the one-time seed, the entropy space, and the token as input. The execution of the random number generator is directly affected by each of the inputs, so that someone examining the computer programming instructions of the random number generator would be unable to determine a resulting key from a known token without also understanding both the entropy space and the one-time seed.

2) Construct entropy space—this is a large set of random data bits (1's and 0's). It could be constructed in any manner that delivers sufficient entropy. For example, it could be created by taking digital samples of a noisy environment and combining that digital sound information with other random digital data to produce an array of random 1's and 0's. This array can be of variable size, but it is static once created for a particular instantiation of a system. If the entropy space was not static after creation, it would be impossible to regenerate a key from a token.

3) Enter the one-time seed—this is a set of data that impacts how the random number generator executes. The one-time seed is used as an input to the random number generator during "Run Time". The one-time seed is combined with bits "fetched" from the entropy space to generate further randomness. As discussed above, the on-time seed may be a Bit Mask as set out above, and Bit Mask may be provided, or directed or supplied with data from which a Bit Mask could be algorithmically, deterministically generated/regenerated.

Run Time:

To initially generate a key:

1) Generate a random number representing the "token" using a computer program that generates random numbers of sufficient entropy.

2) Provide the token as an input to the random number generator, along with the entropy space and one-time seed.

3) With those inputs, the random number generator generates a random string of bits of a length required to represent the required key. The key can then be used as an appropriate symmetric key for an appropriate symmetric cryptography algorithm OR any other process that requires a truly random number of any length.

This approach requires no manual input at run-time to generate a random number that can be derived (re-generated) again by using the same random "token". Similarly, it does not use traditional inputs for random number generation, such a time/date, to impart randomness into the process of specifically generating the key. (Note: Time/date, and other traditional inputs and approaches for generating random numbers, may be used to generate the random number represented by the token, but this number does not need to be regenerated, so there is no problem using traditional methods for random number generation to generate the token).

To regenerate a key from a known token:

1) Provide the previously generated token as an input to the random number generator, along with the entropy space and one-time seed.

2) With those inputs, the random number generator generates a random string of bits of a length required to regenerate the key. The key can then be used as an appropriate symmetric key for an appropriate symmetric cryptography algorithm OR any other process that requires a truly random number of any length.

Various Applications of the Described Technology (Additional Embodiments

Knowledge of the token cannot enable derivation of the key without specific knowledge of the algorithm and each of its inputs to generate the key.

Further, the random number generator used to generate the key does not require human input or any newly entered, "secret" value input at the time of generating and regenerating the key.

The approach also does not depend on traditional inputs to create entropy in random number generators, such as time/date, at the time the key is generated/regenerated.

To reliably regenerate the key, the approach requires that the algorithm and all of the inputs, with the exception of the token, to the algorithm to generate/regenerate the key remain static (or "the same") once the system is put in place.

Ultimately, the system enables the use of a token that can be publicly known and can be used to reliably and repeatedly derive a second random number (the key) that is not publicly known.

Knowing the token gives no advantage to an attacker for determining the key.

Local Key Generation for Local Encryption & Regeneration for Local Decryption

A desktop computer, a server computer, a hardware security module (HSM), a mobile (phone) device/iPad, an Internet-of-Things (IoT) device, or any other device with processing capability (e.g., a computer-controlled car) can hold one or more of the following components to generate keys for encryption and regenerate keys for decryption of data: entropy bit string (EBS), bit string (BS), and bit mask (BM). In this concept, keys are used to encrypt data local to the device (desktop, server, mobile phone, IoT device, etc.). In this case, the data is not intended to be shared, so the only expectation is for the data to be decrypted and used on the local device. Note: the data may be stored off of the device, e.g., in the Cloud, but all encryption/decryption happens locally on the device.

The principle advantages of this approach to generating keys for local encryption and regenerating keys for local decryption are:

Local encryption can be done with random keys that can be regenerated later for decryption.

Local encryption can be done without having to store keys (in memory, on disk, or anywhere else) for later decryption.

Note that not needing to store keys is really "sharing" keys across time. By not physically storing keys anywhere, we effectively can share keys forever. Physically stored keys always face physical constraints (e.g., an HSM containing stored keys cannot last forever).

Local encryption/decryption can be done with only symmetric cryptography, which should require less powerful and sophisticated computing capabilities compared to public-key cryptography A separate TOKEN may be generated for any data to be encrypted, resulting in a unique/random key for each piece of encrypted data. Compared with:

Typically, desktop computers effectively encrypt data using a single cryptographic key for all encrypted objects.

Typically, it is challenging for operating servers to encrypt/decrypt data at rest because there is no ability for anyone to enter a password or other key-protection approach to "unlock" keys to make them available for encryption/decryption. Servers that do encrypt data almost always have a single key that encrypts/decrypts all data and this key is "unlocked" at system boot and held in memory thereafter; for example, database encryption.

In cases where a single key is used for a period of time, there is a need to update/rotate that key to a new key. Key update/rotation is a highly complex activity that is entirely obviated when a different key is used for each piece of encrypted data. In a system that uses a different key for each piece of encrypted data, it is very easy to change the key on any piece of data simply by re-encrypting it.

An additional embodiment of the present invention is discussed below.

This embodiment incorporates randomness into its key generation process—the KeyGen_TOKEN may be a random number supplemented with some additional information bits. Although keys are algorithmically derived, they are random because a critical input (TOKEN) to the algorithm is random. The KeyGen_ENTROPY_BIT_STRING is another source of randomness, even though it is static. The KeyGen_BIT_MASK is another source of randomness—even if someone knows, the TOKEN, the ENTROPY_BIT_STRING, and the BIT_SELECTOR, they will still have no idea what the key should be without knowing the BIT_MASK.

Keys do not need to be stored. They are initially generated for encryption and re-generated, when needed, for decryption.

Keys are not re-used in any predictable manner, unlike all other cryptographic systems. If a key is ever re-used, it is purely by random chance in a very large "space" of chance.

If organizations do not want to share KeyGen elements directly, they can go through an intermediary, which can translate from one domain to another domain.

Flexibility regarding the content of the KeyGen elements and their level of confidentiality (from nothing to high).

The security in public-key cryptography (e.g., RSA, elliptic-curve) is based on complex math problems. It is believed that quantum computing will be able to solve those math problems, thereby rendering public-key cryptography ineffective. Symmetric cryptography, however, bases its security entirely on "randomness". Therefore, symmetric cryptography is not subject to attacks like public-key cryptography and, as a result, symmetric cryptography will become increasingly more important as public-key cryptography loses its effectiveness. Scalable methods for sharing symmetric keys securely will become very important and highly valuable. Increasing the "randomness" factor in symmetric cryptography is very easy—simply increasing key lengths even a small amount substantially increases security.

There are two models for sharing KeyGen-based keys:

1) Direct sharing, where two or more domains share all KeyGen elements, including BIT_MASKs. A piece of data encrypted in one domain can be directly decrypted in the other domain(s). In a Direct sharing system, there is a need to share all elements between each domain that wants to communicate securely. There are a wide variety of possible configurations based on the sharing or not of specific KeyGen elements. For example, two domains can share ENTROPY_BIT_STRINGs and BIT_SELECTORs, but have separate BIT_MASKs for their cross-domain encrypted data and their internal-only encrypted data.

a. An example of where there are big advantages to this approach is in an "operational" and "hot standby" network (considered separate "domains" for these purposes). Since this embodiment does not store any keys, there is no need to synchronize cryptographic keys across an operational and hot stand-by network. This alone solves very significant hot standby issues in networks employing cryptography.

2) Intermediate sharing, where each domain shares all KeyGen elements with an Intermediary. The Intermediary, for example, can decrypt data encrypted by domain A and then re-encrypt the information with a key that can be regenerated for decryption by domain B. In this way, domain's A and B do not have to share any KeyGen elements directly, but yet they can still communicate securely through an Intermediary, which could be a software service on the Internet.

a. Further, in Intermediate sharing, an organization can employ a set of KeyGen elements that is specifically and solely for the purpose of communicating with the Intermediary. Such a domain could use a separate set of KeyGen elements for generating/regenerating keys for its own internal use. A local intermediary service would convert from the internal KeyGen elements to the Intermediary KeyGen elements prior to sending sensitive data to the Intermediary for conversion to be delivered to one or more domains, which would themselves then convert from their local intermediaries to their internal KeyGen domains.

i. In this "domain hopping" approach, data can be decrypted, analyzed and transformed prior to being passed on to the next domain. For example, a document could be translated to a different language meeting the needs of the next domain. The same document could be analyzed for sensitive information which does not match the classification (e.g., Top Secret information in a Secret document) and have that data redacted prior to passing it along.

ii. BMs and other elements could be stored in HSMs so an intermediary would not have access to the detailed keying information it is using to provide its service. If decryption/encryption happen on the HSM entirely, the service could be prevented from seeing the keying information and the information itself. The intermediary service is ultimately just a centralized hub to receive, transform (without seeing anything confidential) and then redistribute secure information.

Authenticated Keygen Sharing & Recovery

The ability to recover encryption/decryption keys is a fundamental requirement. In this context, encryption of stored data is the focus, not encryption of data being transmitted, which is decrypted at the other end of the transmission and not stored.

Loss of access to keys used to encrypt stored data means loss of that data—forever. Therefore, all systems that encrypt stored data include a mechanism to be able to recover keys for decryption.

Key recovery is extremely difficult to do well without introducing vulnerabilities that undermine the entire encryption system. For example, in public key infrastructure (PKI) based systems, key pairs used for encryption are backed up in centralized, secure systems. In this approach, key pairs are recoverable, but the centralized key storage system represents an attack point from technical and social engineering perspectives. Much care needs to be taken around such a system.

Hardware security modules that store keys also have backup mechanisms. Although keys are not intended to be able to be extracted from an HSM, HSM vendors provide the ability to generate a "copy" of the keys in one HSM into one or more additional HSMs to ensure there is a backup/restore capability in case the "master HSM" becomes dysfunctional or is destroyed somehow.

Furthermore, for symmetric cryptography, HSMs store keys that are called "key encrypting keys" (KEKs). These keys are used to encrypt other symmetric keys that are actually used to secure data. Since the encrypting symmetric, sometimes referred to as "data encrypting keys" (DEKs), are encrypted with KEK's, and because KEKs can be backed up/restored, there is always a way to recover the DEKs.

Although these solutions can work from a technical perspective, they are complex and costly. For example, not all computing environments are amenable to HSMs or can afford the cost associated with HSMs. It is infeasible from a cost and management perspective to install an HSM on end-user computers and mobile devices to protect content stored locally.

It can be particularly difficult to keep an "operational" network in synchronization with a "hot stand-by"/"recovery" network when encryption is occurring, particularly with regard to ensuring that everything encrypted in the operation environment can be decrypted in the hot stand-by environment. This can be referred to as a "key synchronization problem".

This embodiment is also highly valuable for secure communications across domains (or installed in a parallel, hot stand-by environment) in either a mediated or unmediated approach. In these situations, there is a need to share "KeyGen" elements in an authenticated and secure manner across domains and/or intermediaries.

However, the KeyGen approach eliminates the "key synchronization problem" because any keys generated in the operational environment can be easily re-generated in the hot stand-by environment. Other than having the same KeyGen elements in place (static), there is no need for any dynamic synchronization between an operational and hot stand-by domain.

In summary, there is a need to ensure that the appropriate elements of a KeyGen system must be authenticated on initial installation, recovery, and sharing.

In this context, the term "authenticated" means that the KeyGen elements are coming from a known, trusted source and that the elements are genuine—they are correct and they have integrity that can be verified.

There are a number of ways in which KeyGen elements can be authenticated and recoverable:

1) The elements can be digitally signed by a known, trusted entity. Digitally signing KeyGen elements provides a verifier with the knowledge that the elements are coming from a trusted source and that they have integrity—nobody has altered them in even a minor way since they were created (which is incredibly important for recovery).

2) The elements can have an integrity check done through a symmetric cryptography-based Message Authentication Code (MAC).

3) The elements can be stored in a location that requires on-line authentication using digital certificates. Such an approach can be enhanced by employing an online encryption protocol, such as Transport Layer Security (TLS) or Secure Sockets Layer (SSL) to ensure that that delivered data has integrity. Of course, there is another benefit of ensuring that the transmission is secure/encrypted.

The above list of approaches can be used individually or in various combinations to achieve the goal of distributing secure, authenticated, and recoverable KeyGen elements.

This embodiment is flexible with regard to which element is kept secret. Any one of the KeyGen_ENTROPY_BIT_STRING, KeyGen_BIT_SELECTOR, or KeyGen_BIT_MASK elements can be the one secret in the system.

In this embodiment, a user of the KeyGen approach keeps the BM secret and the EBS and BS can be known (although not required—users can keep their EBS and BS secret, as well).

In such a situation, users can download authenticated copies of the EBS and BS from a trusted network location (e.g., an authenticated Web site or other Internet site) on system installation. At any later time, the user can download those same authenticated elements if they need to recover their KeyGen system.

Similarly, users wishing to share KeyGen elements can download the same authenticated elements from a trusted network location. These users can also download those elements again, at any time, if needed, to recover their KeyGen system.

Other approaches for distributing authenticated KeyGen elements are:

Digitally signed attachments to email messages
Digitally signed files on a shared folder (e.g., FTP, Google Drive, . . . )
Signed elements in source code With respect to the KeyGen_BIT_SELECTOR element, there is a need to distribute that element in both authenticated, compiled form and "source code" form. The "source code" form is required for long-term recovery if the compiled form is no longer supported by the underlying operating system. In this case, a user of the system can write an alternate KeyGen_BIT_SELECTOR element in another programming language that replicates the functionality of the original KeyGen_BIT_SELECTOR.

Note that there is value in having each element authenticated, but there is also value in creating an authenticated "package" of elements so that users know they are getting the appropriate KeyGen "system" (since getting the correct keys requires all of the correct elements together) for either initial installation or recovery. An authenticated "package" would include individually signed/integrity elements together with a signature/integrity on all the elements put together.

Packages of elements could be put together with easy-to-remember names so that users would not be concerned about remembering each element individually.

KeyGen elements may also be distributed confidentially by using encryption. This may be less valuable than the authentication component because confidentiality can be achieved through transmission encryption. However, if there is a need, KeyGen elements could also be encrypted.

KeyGen Elements in HSMs

Some users of this embodiment will prefer to have the KeyGen elements housed and operating in a hardware security module. HSMs have never before been used to generate and regenerate keys from a "public TOKEN", but there is no reason why the concept of an HSM cannot be applied to the KeyGen approach.

In the HSM model, authenticated KeyGen elements (per the prior concept) could be "loaded" into an HSM. These components would be loaded on initialization and then re-loaded if necessary in a recovery scenario.

An HSM can hold one or many of each element of the KeyGen approach.

For instance, an HSM could have a single KeyGen_ENTROPY_BIT_STRING and a single KeyGen_BIT_SELECTOR algorithm, but numerous KeyGen_BIT_MASKs with each BM corresponding to a domain with which the system connected to the HSM communicates securely. Alternatively, the system could have numerous EBS and BS elements, together with numerous BMs, to enable individual, secure communications with multiple domains, without those domains having to share any of the elements with anything other than the HSM.

In a preferred scenario, the EBS and BS components could be loaded into an HSM, with the authentication of those components being verified either outside the HSM or inside the HSM. The BMs could be entered manually into the HSM so that they would never be stored in the memory of any computer.

A main advantage of an HSM approach is to ensure that the generation and re-generation of cryptographic keys, and the use of those keys, would be done entirely inside the HSM, which is a secure environment that resists attack. When data needs to be decrypted, the data together with its associated KeyGen_TOKEN would be passed into the HSM.

Another advantage of an HSM approach is that the organization/system using a KeyGen system on an HSM does not actually need to know the KeyGen elements. When considered from this perspective, a central organization can distribute HSMs provisioned with full KeyGen systems to customers/partners and have confidential communications with those customers/partners, without those customers/partners needing to know the "secrets" (e.g., BM) required to generate/re-generate symmetric keys. This approach would be highly valuable in a financial network, such as SWIFT, that is a centralized organization communicating securely with thousands of organizations for executing financial transactions.

One-to-Many Security with Derived/Personalized KeyGen_BIT_MASKs

Numerous service providers deal with many external parties and store data for those external parties. For example, Google® Gmail® service has over 1 Billion users and each user has up to 15 GB of storage for emails. The email information stored in Gmail represents a treasure of information for hackers to access. However, encryption of stored data is difficult enough that Google only provides protection for emails while they are "in transit".

If a service provider could easily provide "personalized" encryption of stored email messages, it would be valuable for their customers. By "personalized", it is meant that no two customers would share the same single key or a small set of keys for encryption, but rather each person would have keys that are only used for their data. An ideal solution would involve a unique, "personalized" key for each piece of each user's data; in this case, a unique, "personalized" key for each email.

Embodiments of the present invention enable this type of solution very easily, including the capability to provide key recovery and key sharing across a worldwide domain like Gmail where a user could be anywhere in the world while traveling but still want access to their Gmail.

Embodiments of the present invention could be implemented having one or more EBSs and BSs, but with each user having their own BM. The BMs provide the "personalization" and make a direct attack on the data fruitless since discovering the key for one email does not provide any information to discover the key for another email. The "personalization" of encryption keys makes a "multi-tenant" environment, such as an e-mail server, secure and individualized.

The BMs could be derived from secret information on each user. For example, a service provider could combine answers to security questions (for authenticating the user) to form a "personalized" BM. The main proviso is that the BM could not change for the user once data is encrypted, or the BM could not be changed easily because doing so would mean that data encrypted under the old BM would still have to be decrypted with the old BM.

In this model, the service provider has a one to many relationship with its customers. There is no sharing of keys required because the service provider is doing all of the storage and releases data to its customers on their request, and this release can be done securely using TLS/SSL transmission security. The primary exposure of the data is when it is at rest on service provider's servers (insider/external threat).

For many services, like online email protocols, this solution is ideal for secure storage because the users do not store data on their local devices. All of the data is stored by the service provider. So, users do not need the capability to generate keys on their local devices.

Service providers could charge extra for this type of security. It enables their customers to have protection and compliance with regulations like general data protection regulations (GDPR).

One-to-Many Encryption of a Single Data Object Using Only Symmetric Cryptography with a Unique Key-Encrypting-Key for Each Party There are many cases where encrypting a single object with a single key for access by multiple, distinct and trusted parties is valuable. For example, a centralized intermediary service (as defined earlier in this document) that communicates with multiple parties. Another example is a satellite system that has many secure communications with different customers/parties. A business or research collaboration, or military coalition is another example where one entity in the coalition wants to distribute a single object of information to all members of the coalition in a secure manner. A final example is a centralized organization for financial services like SWIFT.

Traditionally with public-key cryptography, if a single data object (e.g., an email) needed to be encrypted and decrypted by multiple, distinct, and trusted entities (e.g., the email recipients), the following process occurs:

a) A random symmetric key is generated (SK);
b) SK is used to encrypt the data object;
c) The public key for each entity is used to encrypt the SK. The SK can only be decrypted by the entities' corresponding private keys;
d) The encrypted data is packaged together with the list of encrypted copies of SK;
e) When an entity receives the encrypted package, it looks through the list of encrypted copies of SK to find its copy. The entity then decrypts its copy of SK using its private key; and
f) The entity then uses SK to decrypt the data object.

This approach has been used for decades with numerous issues, such as:

Entities have to make sure they have a backup copy of the private key stored in a secure place so that the backup can be recovered if the original private key is lost or destroyed somehow.

Entities have to have access to other users' public keys and know that those keys are trustworthy at the time of use.

Another embodiment is to use KeyGen methods and systems of the embodiments of the invention to generate a single object that is encrypted for multiple, distinct, and trusted entities.

In this embodiment, the steps include:

1) Generate a random symmetric key (KD);
2) Use KD to encrypt the data (ED);
3) Generate a Token (T1) for the Entity (E1) and then generate a random symmetric key (K1) using the "KeyGen elements" (space, algorithm, bitmask) associated with E1;
4) Use K1 to encrypt KD-K1(KD);
5) Repeat steps 3) and 4) until there is a copy of KD (K2(KD), K3(KD), . . . ) encrypted for all entities (E2, E3, . . . ) that need it;
6) Assemble the set of encrypted keys (K1(KD), K2(KD), K3(KD), . . . ) together with the list of Tokens (T1, T2, T3, . . . ) and the encrypted data (ED) into a package and distribute it to all entities; and
7) Each entity finds its Token and associated encrypted key copy (Kx(KD)). It then generates a key using its Token to decrypt KD and then decrypts the data (ED) using KD.

This method of the embodiment of the invention:

Uses only symmetric cryptography;

There are no keys stored anywhere except for encrypted copies of KD, and

The keys required to recover KD are regenerated when needed. This is unlike traditional Key-Encrypting-Keys (KEKs), which must be stored securely for as long as any data associated with the KEKs lives;

Different copies of KD could be encrypted using a different cryptographic algorithms, dependent on the capabilities of the entities receiving the encrypted object.

The entities need to have a relationship with the entity doing the encryption, but do not need any relationships with each other.

Binding Data

This embodiment describes how to use symmetric cryptography to bind different data elements together. For example, there is little value in having data labels if the labels are not bound to data in a secure manner that preserves integrity. Symmetric cryptography, together with the use of Message Authentication Codes (MACs) or Message Digests (MDs), provides a capability to securely bind two or more data elements together.

Traditionally, the problem with using symmetric cryptography for broad binding of data related to scalability, key management and the secure sharing of symmetric keys.

This embodiment uses a public KeyGen_TOKEN to enable the regeneration of a symmetric key. This capability enables symmetric cryptography to be an applicable method to bind two or more data elements together with integrity.

End points can verify integrity, the server only can do a check prior to secure (TLS/SSL) delivery, or it can be done transparently to applications by a proxy checking before delivering securely (TLS/SSL).

Modifications and Variations

It is understood that various symmetric algorithms may be used in embodiments of the present invention, some of which being shown below.

Data Encryption Standard (DES): An encryption algorithm that encrypts data with a 56-bit, randomly generated symmetric key. DES is not a secure encryption algorithm and it was cracked many times. Data Encryption Standard (DES) was developed by IBM and the U.S. Government together. DES is a block encryption algorithm.

Data Encryption Standard XORed (DESX): DESX is a stronger variation of the DES encryption algorithm. In DESX, the input plain text is bitwise XORed with 64 bits of additional key material before encryption with DES and the output is also bitwise XORed with another 64 bits of key material.

Triple DES (3DES): Triple DES was developed from DES, uses a 64-bit key consisting of 56 effective key bits and 8 parity bits. In the Triple DES, DES encryption is applied three times to the plain text. The plain text is encrypted with key A, decrypted with key B, and encrypted again with key C. 3DES is a block encryption algorithm.

RC2 and RC5: Ronald Rivest (RSA Labs), developed these algorithms. They are block encryption algorithms with variable block and key sizes. It is difficult to break if the attacker does not know the original sizes when attempting to decrypt captured data.

RC4: A variable key-size stream cipher with byte-oriented operations. The algorithm is based on the use of a random permutation and is commonly used for the encryption of traffic to and from secure Web sites using the SSL protocol.

Advanced Encryption Standard (AES): Advanced Encryption Standard (AES) is a newer and stronger encryption standard, which uses the Rijndael algorithm developed by Joan Daemen and Vincent Rijmen of Belgium. AES is capable to use 128-bit, 192-bit, and 256-bit keys.

International Data Encryption Algorithm (IDEA): IDEA encryption algorithm is the European counterpart to the DES encryption algorithm. IDEA is a block cipher, designed by Dr. X. Lai and Professor J. Massey. It operates on a 64-bit plain text block and uses a 128-bit key. IDEA uses a total of eight rounds in which it XOR's, adds and multiplies four sub-blocks with each other, as well as six 16-bit sub-blocks of key material.

Blowfish: Blowfish is a symmetric block cipher, designed by Bruce Schneier. Blowfish has a 64-bit block size and a variable key length from 32 up to 448 bits. Bruce Schneier later created Twofish, which performs a similar function on 128-bit blocks.

CAST: CAST is an algorithm developed by Carlisle Adams and Stafford Tavares. CAST uses a 40-bit to 128-bit key.

Methods of the embodiment of the invention are performed using one or more hardware processors, executing processor-executable instructions causing the hardware processors to implement the processes described above. Computer executable instructions may be stored in processor-readable storage media such as floppy disks, hard disks, optical disks, Flash ROMS, non-volatile ROM, and RAM. A variety of processors, such as microprocessors, digital signal processors, and gate arrays, may be employed.

The system 100 of the embodiment of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the system 100 are implemented partially or entirely in software, the modules contain a memory device for storing software instructions in a suitable, non-transitory computer-readable storage medium, and software instructions are executed in hardware using one or more processors to perform the techniques of this disclosure.

As discussed above, the methods and systems of embodiments of the present invention provide numerous advantages, thus making network communications more secure.

It should be noted that methods and systems of the embodiments of the invention and encrypted and decrypted data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

While preferred embodiments of the present inventive concept have been shown and disclosed herein, it will be obvious to those persons skilled in the art that such embodiments are presented by way of example only, and not as a limitation to the scope of the inventive concept. Variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A one-to-many symmetric cryptographic system, comprising:
a central location being in communication with at least one remote location;
the central location having a memory having computer executable instructions stored thereon for execution by a processor, causing the processor to:
receive a document from said at least one remote location; and
provide the document to a cryptographic module for encryption, comprising:
receiving a token;
performing a walk through an entropy space, which is a large set of random bits, to fetch a string of bits, the walk through and the fetched string of bits depending on the token;
generating a secret key for encrypting the document based on the fetched string of bits, thereby generating an encrypted document; and
destroying the secret key upon encrypting the document;
the computer executable instructions further causing the processor to provide the encrypted document to the cryptographic module for decryption, comprising:
receiving the token;
performing the walk through the entropy space to fetch the string of bits; and
generating the secret key for decrypting the encrypted document based on the fetched string of bits;
thereby avoiding storing or communicating the secret key.

2. The one-to-many cryptographic system of claim 1, further comprising a storage space for storing the encrypted document.

3. The one-to-many cryptographic system of claim 1, wherein at least one of the token, the walk through and the entropy space is secret.

4. The one-to-may cryptographic system of claim 1, wherein at least one of the token and the entropy space is publicly available.

5. The one-to-many cryptographic system of claim 1, wherein the walk through is publicly available.

6. The one-to-many cryptographic system of claim 1, wherein the computer readable instructions further cause the processor to further receive a bit mask, and apply the bit mask for generating the secret key.

7. The one-to-many cryptographic system of claim 6, wherein the bit mask is secret.

8. The one-to-many cryptographic system of claim 1, wherein the walk through comprises a pseudo random generator configured to generate a pointer for walking through the entropy space in a step having a bit length, the bit length depending on the token.

9. The one-to-many cryptographic system of claim 8, wherein the bit length of the step comprises an offset value depending on the fetched string of bits.

10. The one-to-many cryptographic system of claim 9, wherein the walk through is configured to add the offset value to the bit length when the fetched string of bits represents an even number, and subtract the offset value from the bit length when fetched string of bits represents an odd number.

11. A method for one-to-many symmetric cryptography, comprising:
in a communication network comprising a central location and at least one remote location, the central location having a memory having computer executable instructions stored thereon for execution by a processor, the method comprising:
receiving a document from said at least one remote location; and
providing the document to a cryptographic module, in communication with the central location, for encryption, comprising:
receiving a token;
performing a walk through an entropy space, which is a large set of random bits, to fetch a string of bits, the walk through and the fetched string of bits depending on the token;
generating a secret key for encrypting the document based on the fetched string of bits, thereby generating an encrypted document;
providing the encrypted document to the cryptographic module for decryption, comprising:
receiving the token;
performing the walk through the entropy space to fetch the string of bits; and
generating the secret key for decrypting the encrypted document based on the fetched string of bits;
thereby avoiding storing or communicating the secret key.

12. The method of claim 11, further comprising destroying the secret key upon encrypting the document.

13. The method of claim 11, further comprising making at least one of the token, the walk through and the entropy space secret.

14. The method of claim 11, further comprising making at least one of the token and the entropy space publicly available.

15. The method of claim 11, further comprising making the walk through publicly available.

16. The method of 11, further comprising receiving a bit mask, and applying the bit mask for generating the secret key.

17. The method of claim 16, further comprising keeping the bit mask secret.

18. The method of claim 11, wherein the performing further comprises generating a pointer for walking through the entropy space in a step having a bit length, the bit length depending on the token.

19. The method of claim 18, further comprising introducing an offset value for the bit length of the step, the offset value depending on the fetched string of bits.

20. A communication network, comprising:
a one-to-many symmetric cryptographic system, comprising:
a central location being in communication with at least one remote location;
the central location having a memory having computer executable instructions stored thereon for execution by a processor, causing the processor to:
receive a document from said at least one remote location; and
provide the document to a cryptographic module for encryption, comprising:
receiving a token;
performing a walk through an entropy space, which is a large set of random bits, to fetch a string of bits, the walk through and the fetched string of bits depending on the token;

generating a secret key for encrypting the document based on the fetched string of bits, thereby generating an encrypted document;

provide the encrypted document to the cryptographic module for decryption, comprising:

receiving the token;

performing the walk through the entropy space to fetch the string of bits; and generating the secret key for decrypting the encrypted document based on the fetched string of bits; and a storage space in communication with the central location for storing the encrypted document; thereby avoiding storing or communicating the secret key.

* * * * *